United States Patent

Torii et al.

Patent Number: 5,609,546
Date of Patent: Mar. 11, 1997

[54] VEHICULAR CONSTANT SPEED CRUISING CONTROL DEVICE

[75] Inventors: Yoshinari Torii, Gamagori; Toshihide Nakashima, Kariya, both of Japan

[73] Assignee: Nippondenso Co., Ltd., Kariya, Japan

[21] Appl. No.: 548,878

[22] Filed: Oct. 26, 1995

[30] Foreign Application Priority Data

Oct. 27, 1994 [JP] Japan .................... 6-264154

[51] Int. Cl.$^6$ .................... B60K 41/04
[52] U.S. Cl. .................... 477/108; 477/121; 477/148; 180/179
[58] Field of Search .................... 477/108, 121, 477/148, 151; 180/179, 170; 364/424.03

[56] References Cited

U.S. PATENT DOCUMENTS

| | | | |
|---|---|---|---|
| 4,984,166 | 1/1991 | Teratani et al. | |
| 5,003,482 | 3/1991 | Teratani et al. | |
| 5,012,419 | 4/1991 | Yamamoto | 477/108 X |
| 5,038,880 | 8/1991 | Matsuoka et al. | 180/170 X |
| 5,088,351 | 2/1992 | Miyake et al. | 477/108 |
| 5,129,475 | 7/1992 | Kawano et al. | 477/108 X |
| 5,148,721 | 9/1992 | Anan et al. | 180/179 X |
| 5,154,250 | 10/1992 | Murai | 477/108 X |
| 5,155,682 | 10/1992 | Ninoyu | 477/108 X |
| 5,251,138 | 10/1993 | Katayama | 180/179 X |
| 5,382,206 | 1/1995 | Oda et al. | 477/108 |
| 5,401,223 | 5/1995 | White et al. | 477/108 |
| 5,434,786 | 7/1995 | Sakonjyu et al. | 180/179 X |
| 5,474,508 | 12/1995 | Kondo et al. | 477/121 X |
| 5,478,293 | 12/1995 | Yonezawa | 477/121 X |
| 5,507,705 | 4/1996 | Hara | 477/108 |
| 5,549,519 | 8/1996 | Seidel et al. | 477/121 X |

FOREIGN PATENT DOCUMENTS 5-319136  12/1993  Japan .

*Primary Examiner*—Charles A. Marmor
*Assistant Examiner*—Peter Kwon
*Attorney, Agent, or Firm*—Cushman, Darby & Cushman IP Group of Pillsbury Madison & Sutro LLP

[57] ABSTRACT

When an overdrive cut is performed to an automatic transmission control when climbing uphill slopes, the actuator position An is stored in overdrive cut aperture storage value C with overdrive cut demands to the automatic transmission executed until the actuator position changes by a first predetermined value Ct1. If the condition C−An>Ct1 is satisfied for a predetermined period of time T0 until timer counter TMR becomes zero, then restoration to overdrive is allowed. Accordingly, even when cruising along long uphill roads, up-shifts to overdrive are prohibited during this time and because there are no up-shifts to overdrive during this time, vehicular speed does not change in fixed periods and thus, a high-level of passenger comfort is achieved.

18 Claims, 14 Drawing Sheets

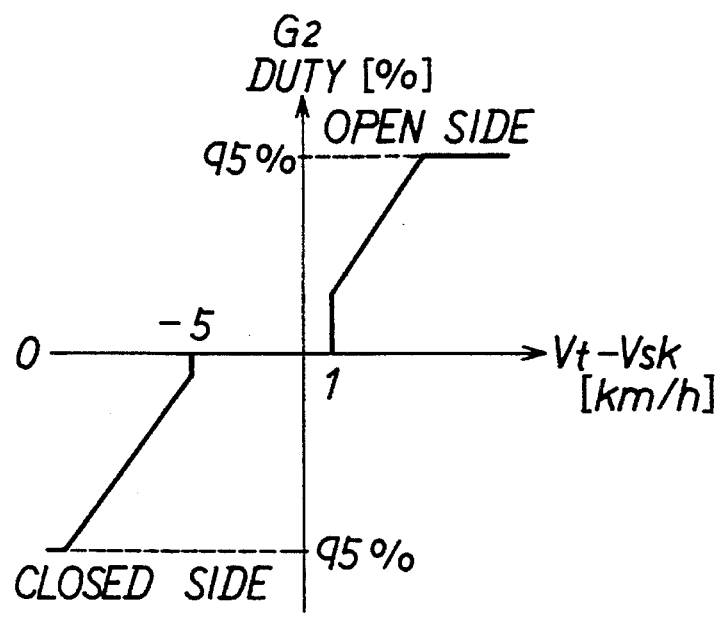
FIG. 11
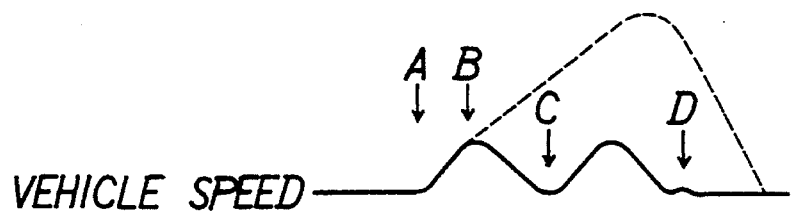
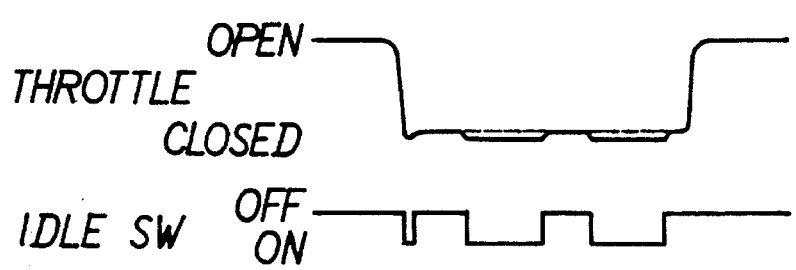
FIG.12A VEHICLE SPEED
FIG.12B THROTTLE
FIG.12C IDLE SW

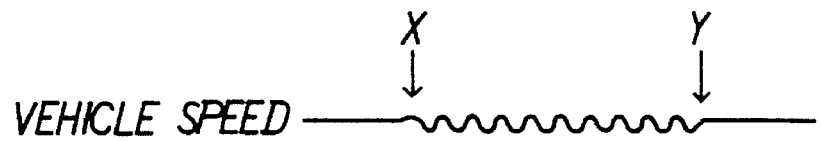
FIG.13A VEHICLE SPEED
FIG.13B THROTTLE
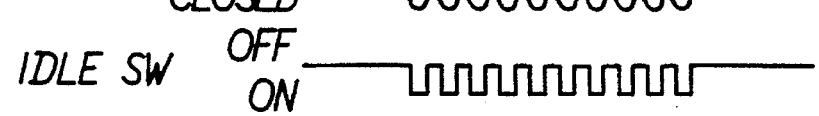
FIG.13C IDLE SW
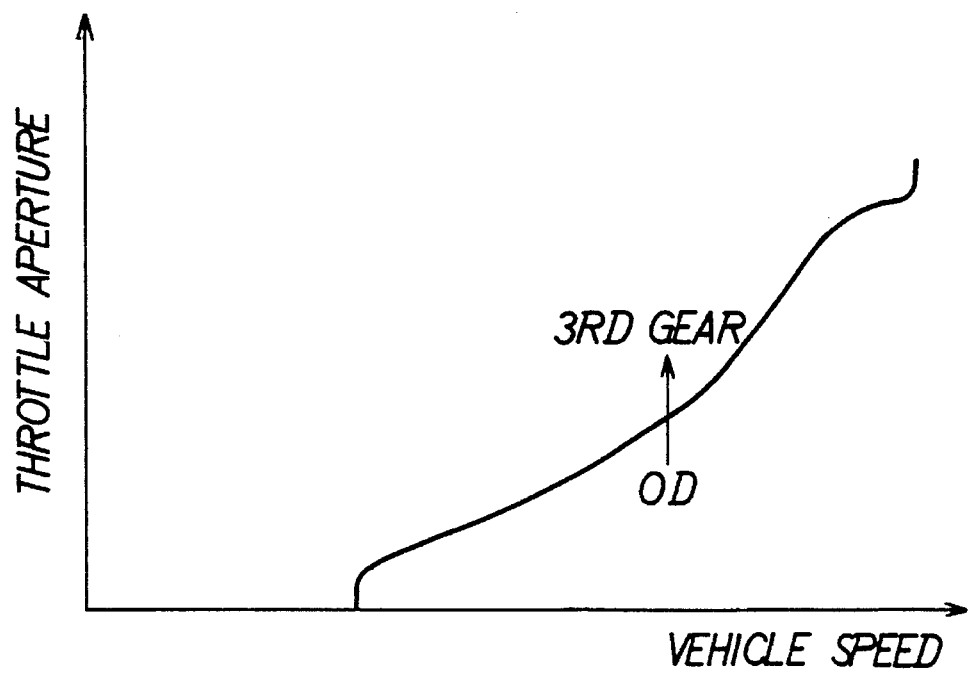
FIG. 14

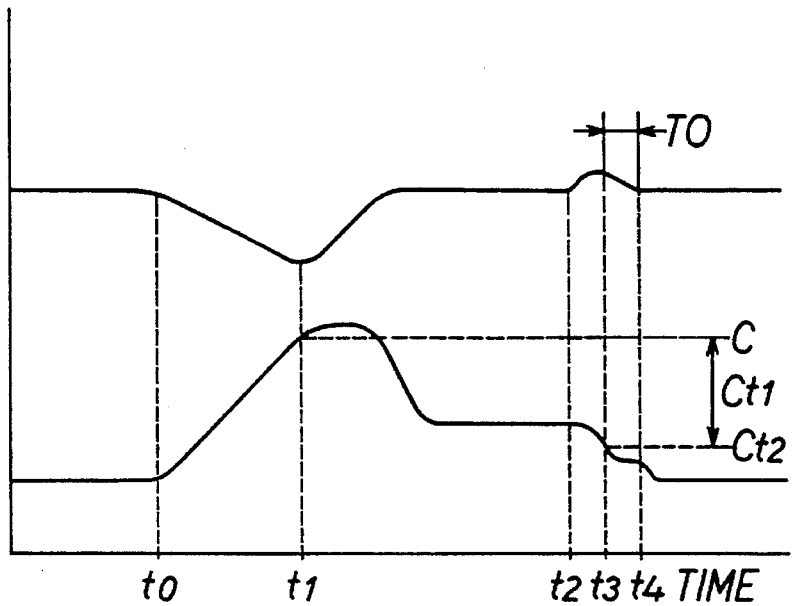
FIG.15A VEHICLE SPEED
FIG.15B ACTUATOR APERTURE
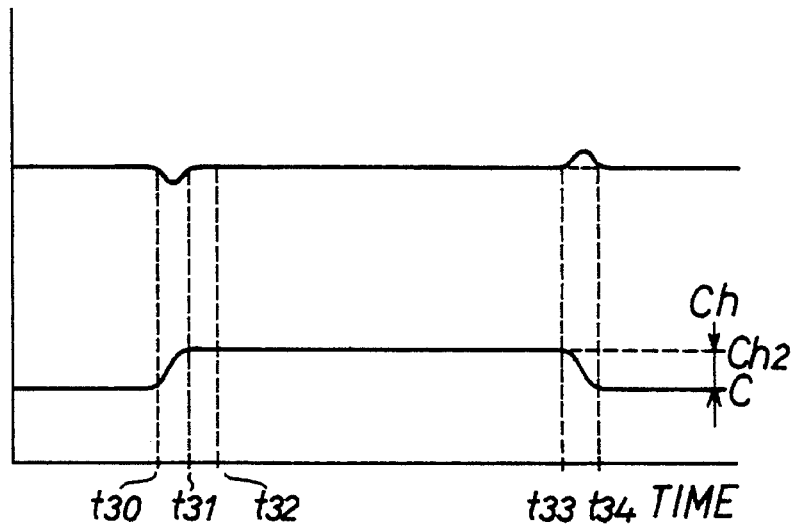
FIG.19A VEHICLE SPEED
FIG.19B ACTUATOR APERTURE

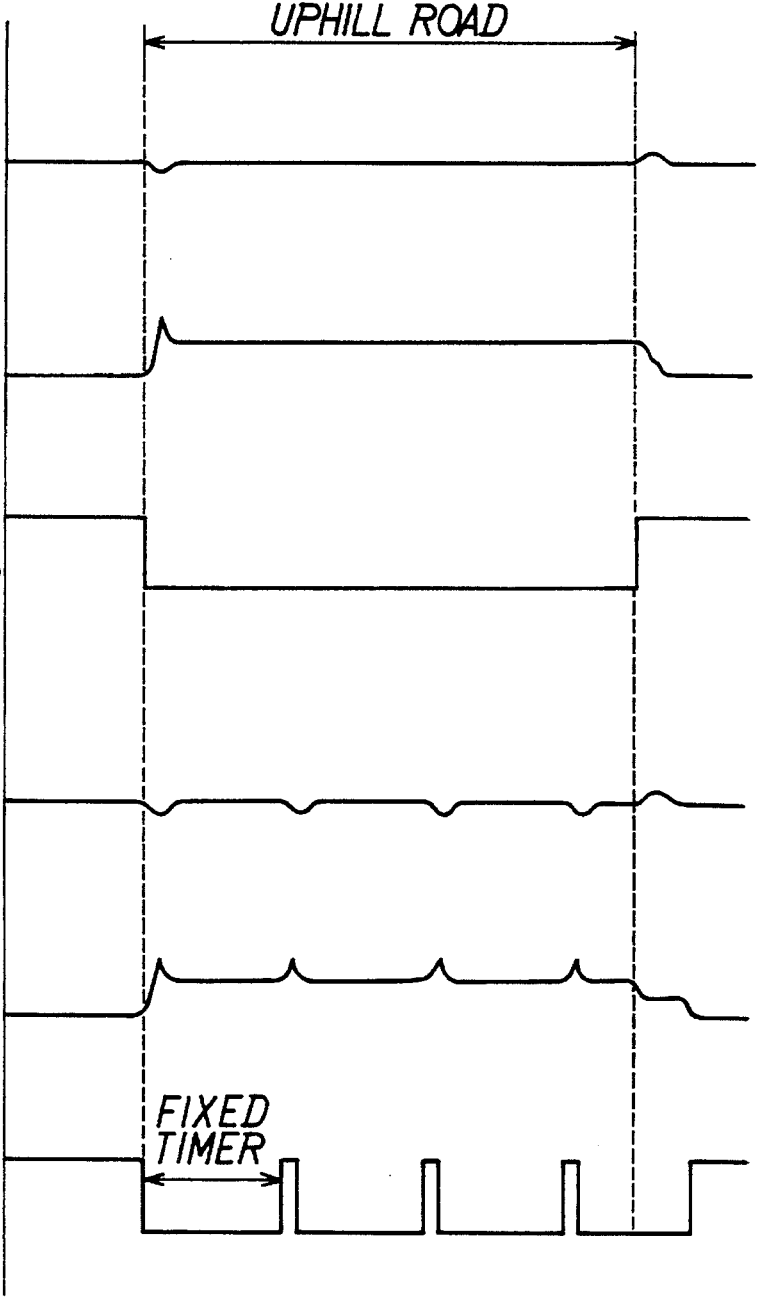

VEHICULAR CONSTANT SPEED CRUISING CONTROL DEVICE

CROSS-REFERENCE TO RELATED APPLICATION

This application is related to and claims priority from Japanese Patent Application No. Hei-6-264154, the contents of which are hereby incorporated by reference.

BACKGROUND OF THE INVENTION

1. Field of the Invention

The present invention relates to a vehicular constant speed cruising control device which is used in a vehicle that has an automatic transmission control device for automatically shifting the gears of the transmission.

2. Description of Related Art

For conventional vehicular constant speed cruising control devices, when constant speed cruising becomes difficult during overdrive cruising along upwardly sloping roads, speed is maintained by providing an overdrive cut signal to the automatic transmission controller to increase driving power. This prevents the occurrence of the commonly known "busy shift" in which the shift control of the vehicular transmission control device and the control of the constant speed cruising control affect each other.

Busy shift, which is a periodic fluctuation in the vehicular speed that occurs at fixed periods, occurs in the following way. Because vehicular speed declines when approaching an upwardly sloping road after overdrive constant speed cruising along a flat road, the constant speed cruising control device tries to maintain constant speed cruising by increasing actuator position and by adjusting the throttle valve to the open side. Because the throttle opening increases with the actuator position, in accordance with the transmission pattern, the automatic transmission control device down-shifts from overdrive. Accordingly, driving power increases, thus causing an increase in the vehicular speed. As a result, the constant speed cruising control device decreases actuator position and adjusts the throttle valve to the closed side to maintain constant speed cruising. The throttle opening decreases in connection with the decrease in the actuator position and thus, following the transmission pattern, the automatic transmission control device up-shifts to overdrive. Therefore, driving power goes down, causing vehicular speed to drop. In this way, vehicular speed is dropping again and hereinafter, the processes noted above are repeated again and again with the fluctuation in the vehicular speed occurring at fixed time intervals. This busy shift gives an unpleasant feeling to the passengers of the vehicle.

Japanese Patent Publication Hei-5-57933 discloses one method of preventing busy shifts in which the constant speed cruising control device prohibits up-shifts of the automatic transmission control device after the latter performs a down-shift from overdrive or the like. Also, the up-shift prohibition is released after a predetermined period of time lapses after the vehicular speed approaches the target cruising speed within a predetermined period of time.

However, for this method disclosed in Japanese Patent Publication Hei-5-57933, because up-shift is allowed after a predetermined period of time has lapsed after the vehicular speed reverts back to the target vehicular speed, then the following cycle occurs when up-shift is executed while the vehicle is still cruising along an upwardly sloping road: drop in the vehicular speed→increase in the actuator position→ execution of down-shift→prohibition of up-shift→increase in the driving force→vehicular speed reverts back to the target level→release of up-shift prohibition after a predetermined period of time lapses→execution of up-shift →decline in the driving power→drop in the vehicular speed. Thus, a vehicular speed fluctuation cycle occurs at predetermined fixed periods and therefore, problems with vehicular passenger comfort still remain unsolved. In addition to this case, there were cases when the timing for releasing up-shift were inappropriate despite the fact that the driver manually prohibited overdrive.

SUMMARY OF THE INVENTION

In view of the foregoing problems of the prior art in mind, it is a goal of the present invention to provide a vehicular constant speed cruising control device which allows the execution of up-shift at the appropriate timing.

To achieve this aim, one aspect of the present invention provides a vehicular constant speed cruising control system which is for a vehicle that has an automatic transmission control device for automatically shifting the gears of a transmission and which includes a vehicular speed detection unit for detecting vehicular speed, an actuator for adjusting throttle opening, a down-shift detection unit for detecting a down-shift in the automatic transmission control device, a constant speed cruising control unit for adjusting engine driving force based on a difference between the vehicular speed detected by the vehicular speed detection unit and a target cruising speed by controlling the actuator to make the vehicular speed coincide with the target cruising speed, a down-shift adjustment amount storage unit for storing an actuator adjustment amount when the down-shift detection unit detects a down-shift, an up-shift prohibition unit for prohibiting up-shift after the down-shift detection unit detects a down-shift, and a first up-shift release unit for releasing the up-shift prohibition of the up-shift prohibition unit when the actuator adjustment amount drops by an amount equal to or above a first predetermined amount from the actuator adjustment amount stored by the down-shift adjustment amount storage unit.

In this way, the first up-shift release unit releases the up-shift prohibition of the up-shift prohibition unit when the actuator adjustment amount drops by an amount equal to or above the first predetermined amount from the actuator adjustment amount stored by the down-shift adjustment amount storage unit.

Thus, when cruising at a certain gear along a flat road that is immediately before an upwardly sloping road, the actuator adjustment amount (also known as the actuator position) which corresponds to the target cruising speed is set to a substantially stable amount that is dependent on the vehicular speed. After entering the upwardly sloping road, actuator position increases to boost the driving power and together with this, the throttle opening becomes bigger and so, the automatic transmission control device down-shifts based on the predetermined shift pattern. Accordingly, the actuator position is lessened to some degree and hereinafter, upwardly sloping road cruising is performed in an up-shift prohibition state imposed by the up-shift prohibition unit. Therefore, there is no problem of such aforementioned vehicular speed fluctuation occurring in fixed periods.

When returning to the flat road following the end of the upwardly sloping road, the actuator position decreases. Furthermore, it stabilizes to the actuator position which corresponds to the target cruising speed for the present gear.

Therefore, by releasing the up-shift prohibition of the up-shift prohibition unit when the actuator position declines by an amount equal to or more than the first predetermined amount, which almost corresponds to the difference between the actuator position during down-shift which is stored by the down-shift adjustment amount storage unit and the actuator position value at which the actuator position stabilizes after returning to the flat road, up-shift is executed at the proper timing, that is, the timing wherein no problems occur if cruising is performed after executing up-shift when returning to the flat road, and the vehicle reverts back to constant speed cruising. Thus, the proper driving power for constant speed cruising can be secured without periodic fluctuations in the vehicular speed and the vehicle can revert back to constant speed cruising at the original gear level after returning to the flat road.

From the fact that the actuator position during stable cruising corresponds to the vehicular speed at each gear shift, the first predetermined amount should be set according to the vehicular speed. The vehicular speed detected by the vehicular speed detection unit can be set as the vehicular speed. During the execution of constant speed cruising control, the target cruising speed can also be set as the vehicular speed. More concretely, it is desirable that the first predetermined amount be equal to or be slightly less than the difference between the actuator adjustment amount stored by the down-shift adjustment amount storage device and the actuator adjustment amount which corresponds to the stable throttle opening at the above-mentioned target cruising speed after down-shift.

Another aspect of the present invention provides a vehicular constant speed cruising control system wherein the first predetermined amount is set according to the vehicular speed.

A further aspect of the present invention provides a vehicular constant speed cruising control system wherein the first predetermined amount is equal to or below a difference between the actuator adjustment amount stored by the down-shift adjustment amount storage unit and the actuator adjustment amount which corresponds to a stable throttle opening at the target cruising speed after down-shift.

An object of another aspect of the present invention is to provide a vehicular constant speed cruising control system which is for a vehicle having an automatic transmission control device for automatically shifting gears of a transmission and manually executing a down-shift and which includes a vehicular speed detection unit for detecting vehicular speed, an actuator for adjusting throttle opening, a down-shift detection unit for detecting a down-shift in the automatic transmission control device, a constant speed cruising control unit for adjusting engine driving force based on a difference between the vehicular speed detected by the vehicular speed detection unit and a target cruising speed by controlling the actuator to make the vehicular speed coincide with the target cruising speed, a down-shift adjustment amount storage unit for storing an actuator adjustment amount when the down-shift detection unit detects a down-shift, a down-shift vehicular speed storage unit for storing the vehicular speed detected by the vehicular speed detection unit when the down-shift detection unit detects a down-shift, an up-shift prohibition unit for prohibiting up-shift after the down-shift detection unit detects a down-shift, and a second up-shift release unit for releasing the up-shift prohibition of the up-shift prohibition unit when the actuator adjustment amount exceeds the actuator adjustment amount stored by the down-shift adjustment amount storage unit by a second predetermined amount and the vehicular speed detected by the vehicular speed detection unit is almost equal to the vehicular speed stored by the down-shift vehicular speed storage unit.

In this way, the automatic transmission control unit also executes down-shift manually and the second up-shift release unit releases the up-shift prohibition of the up-shift prohibition device when the actuator adjustment amount exceeds the actuator adjustment amount stored by the down-shift actuator adjustment amount storage unit by the second predetermined value and when the present vehicular speed detected by the vehicular speed detection unit is almost equal to the vehicular speed stored in the down-shift vehicular speed storage device.

When cruising along a flat road at a constant speed using a certain transmission gear, there are cases when the automatic transmission control device is down-shifted manually because the driver thinks such an unnecessary move is needed or because of some errors. If up-shift is prohibited in this case as in the case of upwardly sloping road cruising, because flat-road cruising is in progress, the actuator aperture becomes bigger than the actuator position during down-shift. Thus, having decreasing actuator position as the condition for releasing the up-shift prohibition, there is a possibility that the vehicle will not revert back to constant speed cruising at the original transmission gear even if cruising is being performed along a flat road.

When down-shifting along the same flat road mentioned above, the actuator position has to be bigger to perform constant speed cruising at the transmission gear after down-shift. For this reason, the second up-shift release unit releases the up-shift prohibition of the up-shift prohibition unit even during cruising along a flat road by assuming that down-shift has been executed when the actuator adjustment amount increases to a level that exceeds the actuator adjustment amount stored by the down-shift actuator adjustment amount storage unit by an amount equal to or more than the second predetermined value and when the present vehicular speed detected by the vehicular speed detection unit is almost equal to the vehicular speed stored in the down-shift vehicular speed storage device.

In this way, when cruising along a flat road at constant speed at a certain transmission gear, the vehicle can revert back to the constant speed cruising state of the original transmission gear even if the automatic transmission control device is down-shifted manually by the driver either because he thinks there is a need for such an unnecessary move or by mistake.

Because the actuator position during stable cruising corresponds to the vehicular speed at each transmission gear, it is desirable that the second predetermined amount be set according to the vehicular speed. Here, the vehicular speed detected by the vehicular speed detection unit can be set as the vehicular speed. During the execution of constant speed cruising control, the target cruising speed can also be set as the vehicular speed. More concretely, it is desirable that the second predetermined amount be equal or slightly less than the difference between the actuator adjustment amount stored by the down-shift adjustment amount storage device and the actuator adjustment amount which corresponds to the stable throttle opening at the above-mentioned target cruising speed after down-shift.

A yet further aspect of the present invention provides a vehicular constant speed cruising control system wherein the second predetermined amount is set according to the vehicular speed.

An additional aspect of the present invention provides a vehicular constant speed cruising control system wherein the second predetermined amount is equal to or slightly lower than a difference between the actuator adjustment amount stored in the down-shift adjustment amount storage unit and the actuator adjustment amount which corresponds to a stable throttle opening at the target cruising speed after down-shift.

In yet another aspect of the present invention, a vehicular constant speed cruising control system, which is for a vehicle that has an automatic transmission control device for automatically shifting the gears of the transmission, includes a vehicular speed detection unit for detecting vehicular speed, an actuator for adjusting throttle opening, a down-shift detection unit for detecting a down-shift in the automatic transmission control device, a constant speed cruising control unit for adjusting engine driving force based on a difference between the vehicular speed detected by the vehicular speed detection unit and a target cruising speed by controlling the actuator to make the vehicular speed coincide with the target cruising speed, an up-shift prohibition unit for prohibiting up-shift after the down-shift detection unit detects a down-shift, and a third up-shift release unit for releasing the up-shift prohibition of the up-shift prohibition unit when the actuator adjustment amount falls below an amount equal to or slightly more than the actuator adjustment amount that corresponds to the throttle opening when cruising along flat roads at the target cruising speed after down-shift.

In this way, while the previous aspects use the first up-shift release unit which allows up-shift when the relative amount of decline from the actuator position during down-shift is equal to or more than the first predetermined amount, the present aspect which does not need the down-shift adjustment amount storage unit uses the third up-shift release unit in place of the first up-shift release unit. This third up-shift release unit releases the up-shift prohibition of the up-shift prohibition unit when the actuator adjustment amount (actuator position) is equal to or less than the actuator adjustment amount which corresponds to the stable throttle opening during constant speed cruising along flat roads after down-shift. Thus, up-shift is allowed by determining the absolute amount of decline in the actuator adjustment amount.

Another aspect of the present invention provides a vehicular constant speed cruising control system for a vehicle which has an automatic transmission control device for automatically shifting the gears of the transmission and for manually executing down-shift and which includes a vehicular speed detection unit for detecting vehicular speed, an actuator for adjusting throttle opening, a down-shift detection unit for detecting a down-shift in the automatic transmission control device, a constant speed cruising control unit for adjusting engine driving force based on a difference between vehicular speed detected by the vehicular speed detection unit and a target cruising speed by controlling the actuator to make the vehicular speed coincide with the target cruising speed, a down-shift vehicular speed storage unit for storing vehicular speed detected by the vehicular speed detection unit when the down-shift detection unit detects down-shift, an up-shift prohibition unit for prohibiting up-shift after the down-shift detection unit detects a down-shift, and a fourth up-shift release unit for releasing the up-shift prohibition of the up-shift prohibition unit when the actuator adjustment amount equals or exceeds an amount that is equal to or slightly less than the actuator adjustment amount that corresponds to the stable throttle opening when cruising along flat roads at the target cruising speed after down-shift.

While the second up-shift release unit, which allows up-shift for the case when the relative increase in the actuator adjustment amount from the actuator adjustment amount during down-shift is equal to or more than the second predetermined amount, is used in the previous aspects, the present aspect which has no need for the down-shift adjustment amount storage unit uses the fourth up-shift release unit in place of the second up-shift release unit. This fourth up-shift release unit releases the up-shift prohibition of the up-shift prohibition unit when the actuator adjustment amount (actuator position) equals or exceeds a value equal to or slightly less than the actuator adjustment amount which corresponds to the stable throttle opening during flat road cruising at the target cruising speed after down-shift and when the vehicular speed detected by the vehicular speed detection unit during that time is almost equal to the vehicular speed stored by the down-shift vehicular speed storage unit. Thus, the fourth up-shift release unit allows up-shift after determining the absolute amount of increase in the aperture adjustment amount.

An additional aspect of the present invention is that a vehicular constant speed cruising control system further includes the first up-shift release unit or the third up-shift release unit.

In this way, the vehicular constant speed cruising control system is more effective.

In yet another aspect of the present invention, a vehicular constant speed cruising control system further includes the down-shift adjustment amount storage unit and the first up-shift release unit.

In this way, the vehicular constant speed cruising control system has the effects of both units.

Moreover, an additional aspect of the present invention is that a vehicular constant speed cruising control system further includes the third up-shift release unit.

In this way, the vehicular constant speed cruising control system becomes more effective.

One other aspect of the present invention provides a vehicular constant speed cruising control system wherein the overdrive is the shift gear that is the target for up-shift prohibition or release.

It must be noted here that in the aforementioned aspects of the present invention, the overdrive or the third gear, for example, can be set as the target for up-shift prohibition or release.

Another aspect of the present invention provides a vehicular constant speed cruising control system wherein the adjustment amount of the actuator is computed by accumulating values that are derived through computations in which outputs that drive the actuator are the parameters.

In this way, there will be no need for a device that detects the aperture of the actuator.

Further, an additional aspect of the present invention provides a vehicular constant speed cruising control system wherein the adjustment amount of the actuator is computed by accumulating values that are derived through computations in which outputs and electric power voltages that drive the actuator are the parameters.

In this way, there will be no need for a device that detects the aperture of the actuator. Also, the actuator position is detected more accurately.

BRIEF DESCRIPTION OF THE DRAWINGS

Additional objects and advantages of the present invention will be more readily apparent from the following detailed description of preferred embodiments thereof when taken together with the accompanying drawings in which:

FIG. 11 is a graph for computing the duty ratio from the fuel cut duty ratio;

FIGS. 12A–12C are timing charts which show the states of the vehicular speed, throttle opening and idle switch, respectively, for steep downwardly sloping roads for the cases of graphs G1 and G2;

FIGS. 13A–13C are timing charts which show the states of the vehicular speed, throttle opening and idle switch, respectively, for steep downwardly sloping roads for the case of graph G1;

FIG. 14 is a shift pattern diagram between the overdrive and the third gear for the automatic transmission electronic control device;

FIGS. 15A and 15B are timing charts showing the execution of the busy shift countermeasure procedure for upwardly sloping roads;

FIG. 16A–16C are timing charts showing an example where busy shift is prevented, and FIGS. 16D–16F are timing charts showing a conventional example where busy shift cannot be prevented;

FIGS. 19A and 19B are charts showing the effects of the manual overdrive cut countermeasure procedure of the third embodiment.

DETAILED DESCRIPTION OF PRESENTLY PREFERRED EXEMPLARY EMBODIMENTS

The preferred embodiments of the present invention are hereinafter described with reference to the accompanying drawings.

Figure 1:
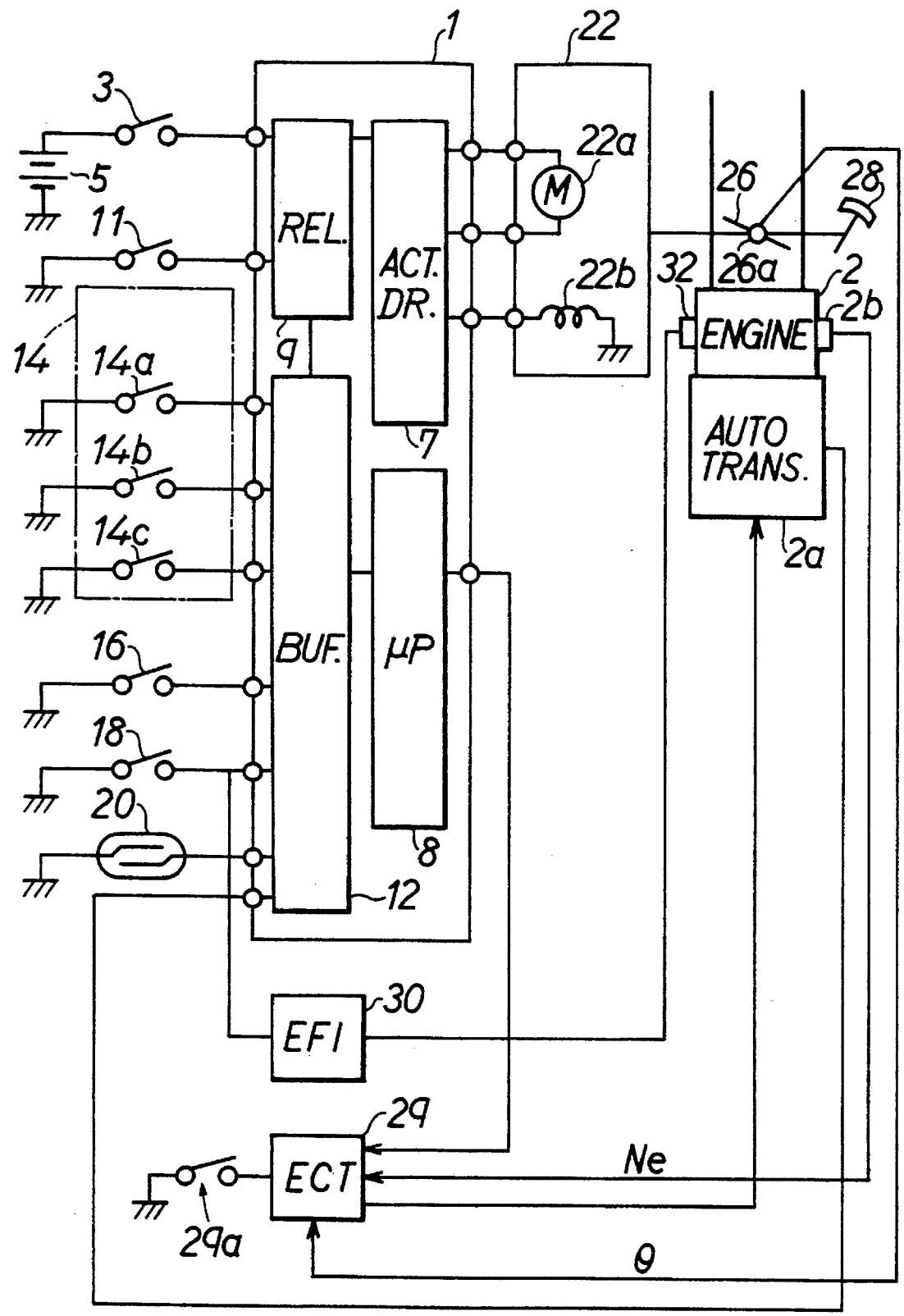
FIG. 1 is a schematic diagram showing the entire construction of a constant speed cruising control system according to a first embodiment of the present invention.

FIG. 1 shows the entire construction of a constant speed cruising control device according to a first embodiment. This constant speed cruising control device is mounted together with an automatic transmission electronic control device (ECT) 29 and an electronic control fuel injection device (EFI) 30 in a vehicle which is mounted with a gasoline engine 2 and automatic transmission 2a.

Cruise ECU 1 which implements constant speed cruising control is connected to a battery 5 via an ignition switch 3. When the ignition switch 3 is actuated, electric power is supplied to the ECU 1 and microcomputer 8 operations become possible. Also, an actuator driving stage 7 which is provided inside the cruise ECU 1 is supplied with electric power via a main relay 9. This main relay 9 is connected to a constant speed cruising control main switch 11. When this main switch 11 is actuated, the main relay 9 is activated, electric power is supplied to the actuator driving stage 7 and thus, operation of the actuator driving stage 7 becomes possible.

The microcomputer 8 is formed as a regular computer that has ROM, RAM, I/O, bus lines and the like. This microcomputer 8 is provided with various signals from the different sensors and switches via an input buffer 12. In the present embodiment, the microcomputer 8 is provided with signals from an electric current detection sensor 13, control switches 14 which are for implementing constant speed cruising control, a stop-run switch 16 which is actuated when the driver steps on the brake pedal, an idle switch 18 which is actuated when the throttle opening is completely closed and a vehicular speed sensor (vehicular speed detection unit) 20 which generates a signal having a frequency that is proportional to the vehicular speed.

Control switch 14 includes a set switch 14a, a resume switch 14b and a cancel switch 14c. It must be noted here that the set switch 14a, the resume switch 14b and the cancel switch 14c are switches which actuate only when pressed and which deactuate immediately after release.

Based on the signals from the various sensors and switches, the microcomputer 8 sequentially executes program commands that are stored in ROM and provides a driving command to the actuator driving stage 7 if necessary.

The actuator driving stage 7, which is a driving circuit for driving the actuator 22, provides a motor 22a and a clutch 22b with driving outputs which correspond to the driving commands from the microcomputer 8. For example, the normal rotation/reverse rotation and rotational speed of the motor 22a is controlled by the actuator driving stage 7. In addition, when the motor 22a gets connected to the clutch 22b due to the output of the actuator driving stage 7, the rotation of the motor 22a is transmitted to the throttle valve 26 of the engine 2 via predetermined connecting parts such as the clutch 22b, the rotation lever and the like. Thus, the microcomputer 8 is able to adjust the driving power of the engine 2 and as a result, control of the vehicular speed is possible. With the use of springs, the predetermined connecting parts mentioned above and the throttle valve 26 are always set in a closed state.

Also, as a well-known construction, the accelerator pedal 28 and the throttle valve 26 are connected in a manner that the amount of depression of the accelerator pedal 28 is coupled with the throttle opening. While the depression operation of the accelerator pedal 28 and the rotational operation of the motor 22a when it is connected with the throttle valve 26 can be performed independently from each other, it must be noted here that among these two operations, it is the increase in the throttle opening which is reflected in the rotation of the throttle valve 26. Therefore, even if the motor 22a rotates to close throttle valve 26, that is, even if the actuator position is entirely closed, depressing the acceleration pedal 28 results in the throttle valve having an aperture that corresponds to the amount of depression of the acceleration pedal 28. Conversely, even if the acceleration pedal 28 is not depressed and the actuator position is not in a completely closed state, the motor 22a can rotate in a direction that opens the throttle valve and in doing so, the throttle opening will correspond to the rotation of the motor 22a. That is, the throttle opening will correspond to the actuator position. Explanation on the details of this well-known structure is omitted here.

Aside from the constant speed cruising control device mentioned above, the vehicle is also provided with the automatic transmission electronic control device 29. The automatic transmission electronic control device 29 receives a rotational frequency signal Ne from a rotational frequency sensor 2b which detects the rotational frequency of the engine 2 and a throttle opening signal θ from a throttle opening sensor 26a which is provided in the throttle valve 26, computes the vehicular speed based on the rotational frequency and the present transmission gear, determines the next transmission gear from the vehicular speed and the throttle opening using a shift pattern map, and switches the automatic transmission 2a to the appropriate transmission gear. Information on the switching state of the automatic transmission gear to the appropriate transmission gear is also provided to the microcomputer 8 of the cruise ECU 1 via the input buffer 12. Also, the prohibition of the up-shift to overdrive and the release signals from the microcomputer 8 of the ECU 1 as well as the on/off signal from the overdrive off switch 29a are also provided to the automatic transmission electronic control device 29. An overdrive off switch 29a is a switch for prohibiting the driver to switch the automatic transmission 2a to overdrive. Thus, actuating this switch prohibits the overdrive state while turning the same switch off provides the automatic transmission electronic control device 29 with a command that allows the overdrive state.

Furthermore, the vehicle is provided with the electronic control fuel injection device 30. This electronic control fuel injection device 30 computes the necessary amount of fuel in accordance with the load to the engine 2 or the like and supplies the inlet air chamber with fuel through an injector 32. Furthermore, the electronic control fuel injection device also performs fuel cut control based on a predetermined fuel cut condition which, for the present embodiment, is the condition that the idle switch 18, which indicates that the throttle valve 26 is in a completely closed state during cruising, remains actuated for a predetermined period of time (for example, 500 msec).

Figure 2:
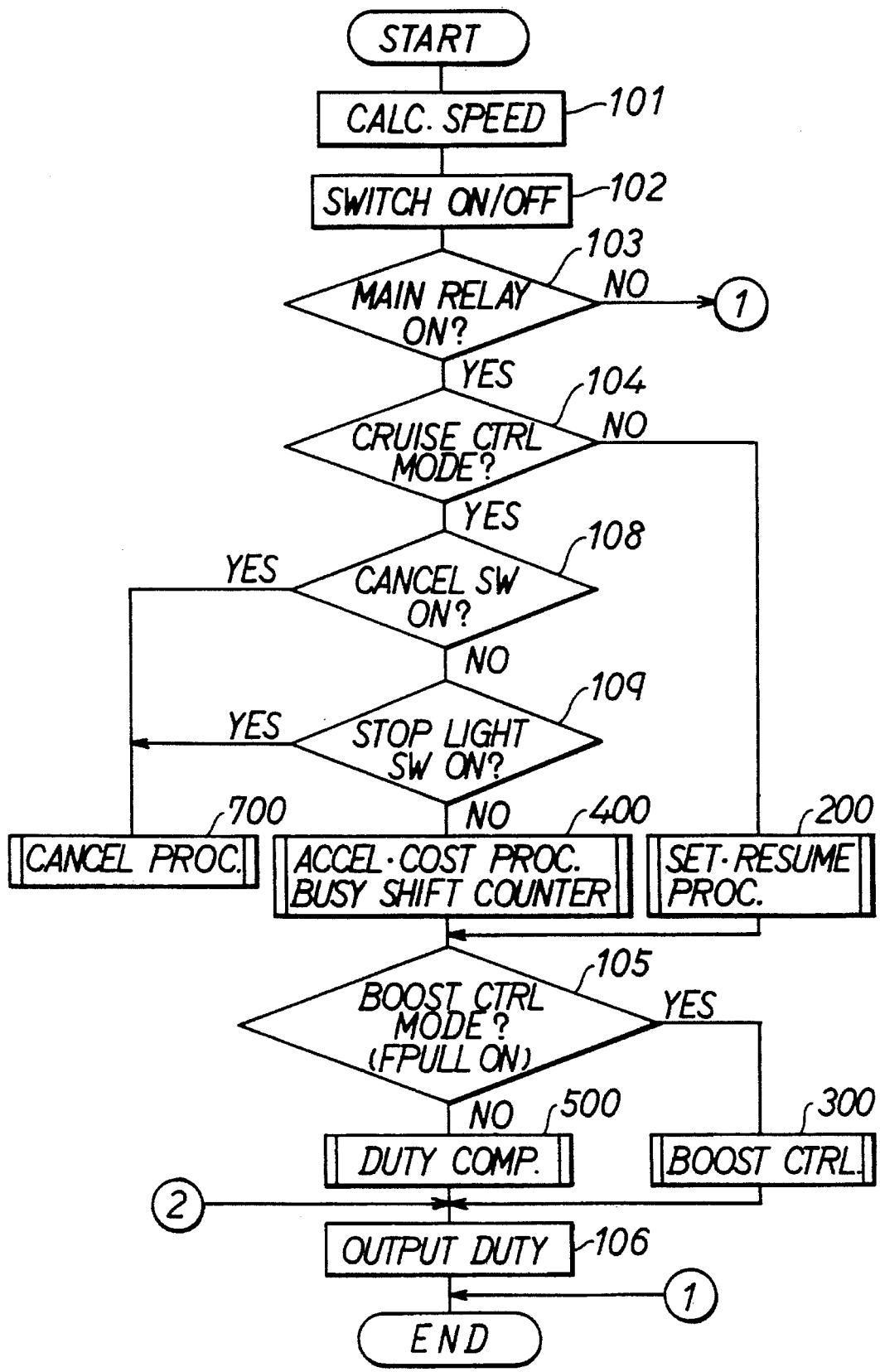
FIG. 2 is a flowchart of a constant speed cruising control procedure implemented by the constant speed cruising control system.

Next, the constant speed cruising control process executed using the microcomputer 8 is explained using flowcharts shown in FIG. 2 and in the figures thereafter.

After actuating the ignition switch 3 which enables the supply of electric power to the microcomputer 8 of the cruise ECU 1, the constant speed cruising control process shown in FIG. 2 is executed for every control period T (for example, 48 msec). This process computes the output duty ratio (%) based on the computed vehicular speed and the actuation of the switches or the like and electrically connects the motor 22a of the actuator for a time interval of T * duty ratio/100.

First, step 101 reads the period of the signal of the vehicular speed sensor 20 and computes the present vehicular speed (vehicular speed:Vn). Next, step 102 determines the on-off states of the control switch 14, the stop-lamp switch 16 and the idle switch 18. Step 103 determines if the main relay 9 is actuated or not. This step prevents switching to constant speed cruising control when the actuator driving stage 7 is not yet supplied with electric power. When the main relay 9 is not yet on, the control cycle ends without performing the duty ratio computation process or the like, and control does not proceed until the start of the next cycle.

When the main relay 9 is actuated, step 104 determines if constant speed cruising control is being executed or not. Following this step, the flow of control to be executed next is determined based on the contents of the inputs of the control switch 14.

If step 104 determines that the constant speed cruising control is not in progress, then control goes to step 200 which executes the set/resume process. This set/resume process determines if control is in the constant speed cruising control mode or not. Here, the set process involves the execution of the constant speed cruising control when the constant speed cruising control is not being performed by pressing the set switch 14a to retrieve the vehicular speed Vn for that time and store Vn as both the target speed Vt and the stored vehicular speed Vm. The resume process is explained later.

Figure 3:
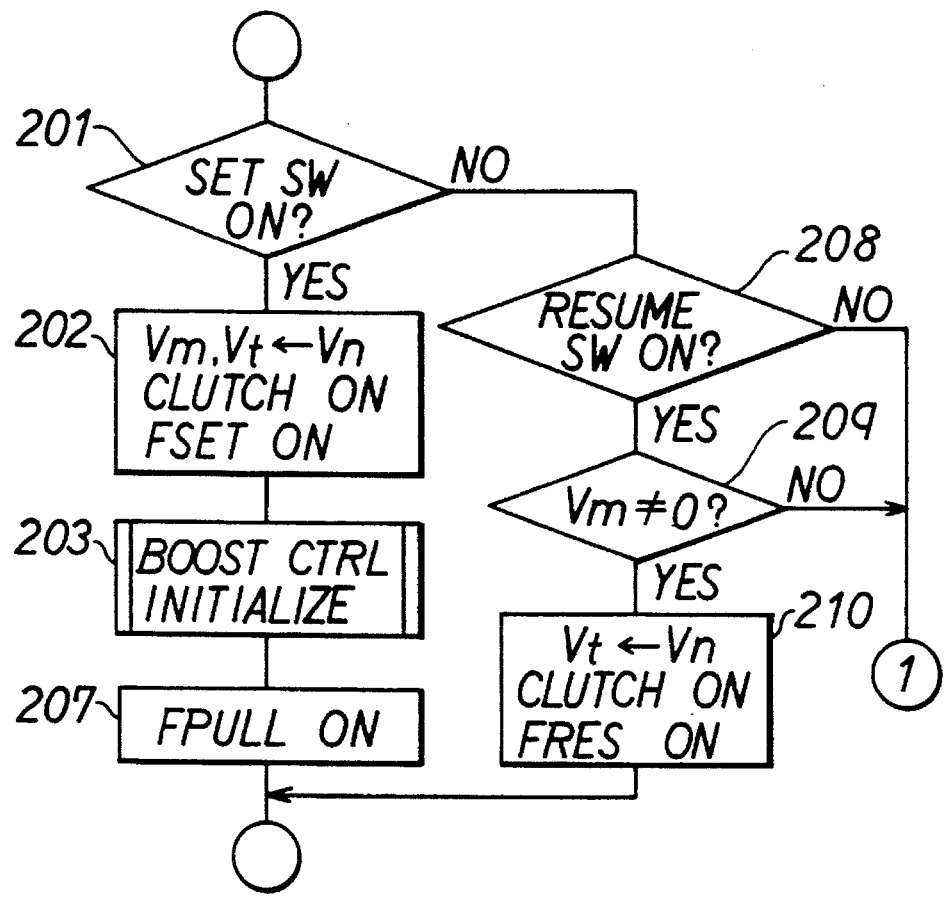
FIG. 3 is a flowchart of a set/resume procedure.

The flowchart of the set/resume process (step 200) is shown in FIG. 3. First, step 201 determines if the set switch 14a is actuated or not. If the set switch 14a is actuated, step 202 sets the vehicular speed Vn computed in step 101 which immediately precedes step 201 as the target speed Vt and as the stored vehicular speed Vm, actuates clutch 22b to apply the rotation of the motor 22a to the throttle valve and sets the set flag FSET. Moreover, step 203 performs a boost control initialization procedure which prevents drops in the vehicular speed when constant speed control is being executed.

Drops in the vehicular speed while the constant speed control is in progress represent temporary drops in the vehicular speed which are due to the fact that the actuator of motor is in a completely closed position immediately after the execution of constant speed control and that delays occur before the engine rotates from such a position to a throttle opening level that enables constant speed cruising. To prevent such drops, the motor 22a of the actuator 22 is driven temporarily to the open side immediately after the execution of constant cruising speed control. Step 203 which is the boost control initialization procedure computes this driving amount.

Figure 5:
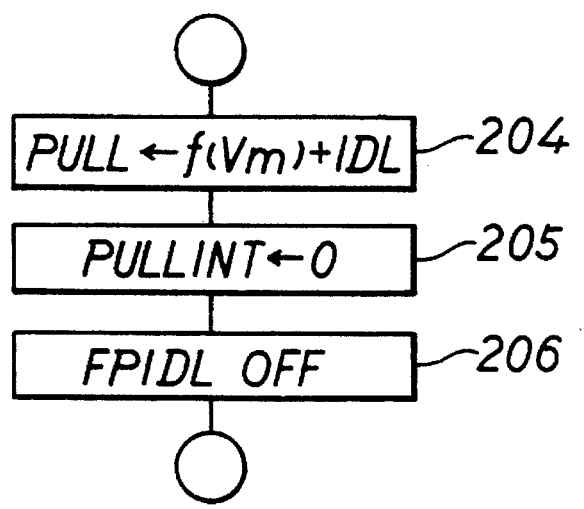
FIG. 5 is a flowchart of initial boost procedure during constant speed control.

FIG. 5 shows a detailed flowchart of step 203 which is the initial boost control procedure during the constant speed control mode. First, step 204 computes an amount PULL (which corresponds to the number of iterations in the constant speed cruising control processing), which is an amount for driving the motor 22a to the open side, using Eq. (1) shown below by adding f(Vm) which is computed as a function of the stored vehicular speed Vm, and a predetermined amount IDL.

$$PULL \leftarrow f(Vm) + IDL \tag{1}$$

It must be noted here that the predetermined amount IDL corresponds to the idle values of link and throttle link systems.

Next, step 205 resets an amount PULLINT which is explained later. Step 206 resets flag FPIDL and the initial boost control procedure of step 203 terminates. Next, step 207 sets flag FPULL which indicates that boost control is being executed. Therefore, in the next control cycle, when determining if boost control is being executed, in other words, when determining whether the flag FPULL is set or not, step 105 gives a positive output and step 300 executes boost control.

Figure 6:
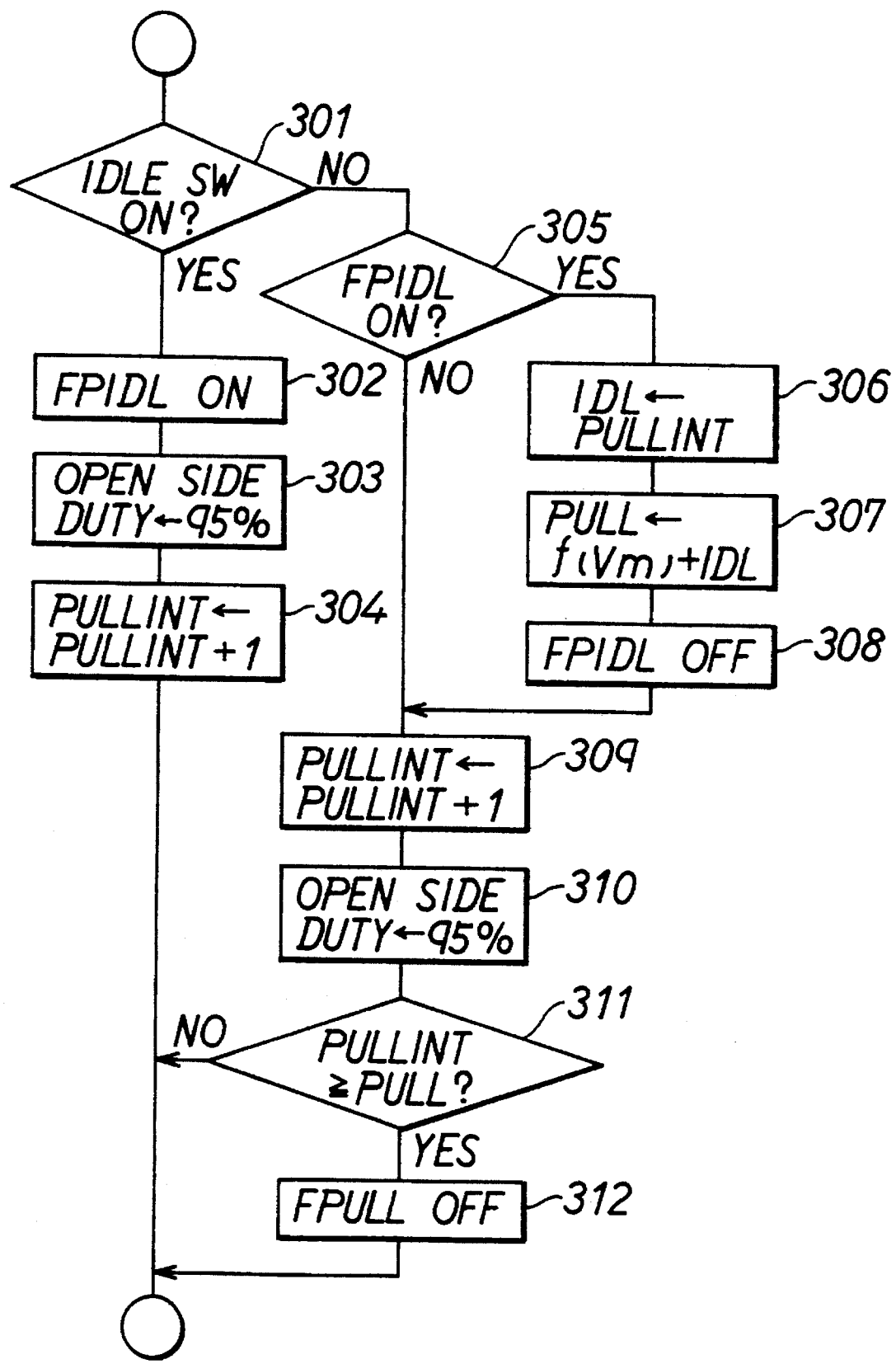
FIG. 6 is a flowchart of the boost control procedure.

The flowchart of the boost control process is shown in FIG. 6. When the idle switch 18 is in the actuated state during the first execution of constant speed control in the process of step 200, this indicates that the present aperture of the motor 22a of the actuator 22 is still in the idle position and that the throttle valve 26 is in a completely closed position.

Therefore, step 301 determines if the idle switch 18 is actuated. If so, step 302 sets flag PIDL which indicates that the idle switch 18 is detected to be in the actuated state during boost control. Step 303 generates a fixed duty ratio (for example, a high-speed duty ratio of 95%) as an output duty ratio to drive the actuator 22 to the open side at a high-speed. Furthermore, step 304 uses counter PULLINT to count the number of output duty ratios that have been generated so far. Therefore, in the duty ratio output process of step 106, for example, the idle rotations are cancelled promptly by turning the motor 22a to the open side swiftly at a duty ratio of 95%.

Starting the procedure again from step 101 for the next control cycle, following steps 102 and 103, step 104 gives a positive output since constant speed cruising control is being executed. Step 108 determines if the cancel switch 14c is actuated or not. Step 109 determines if the stop-lamp switch 16 is actuated or not. Since both cancel and stop-lamp switches are in the deactuated state, both steps 108 and 109 give negative outputs and so, control proceeds to step 400 which is the busy shift countermeasure procedure.

Figure 4:
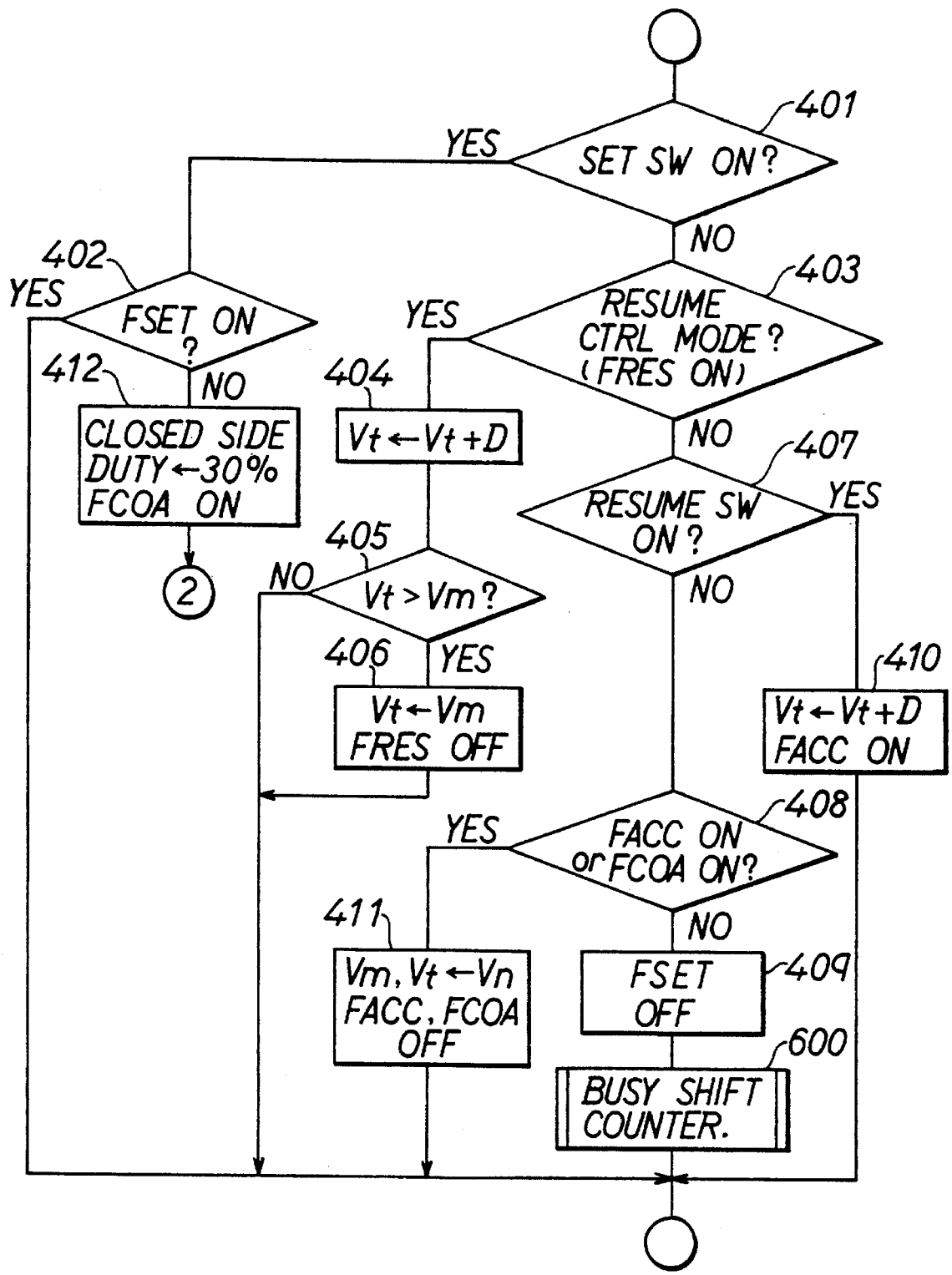
FIG. 4 is a flowchart of an accelerator cost and busy shift countermeasure procedure.

The flowchart of the acceleration cost and the busy shift countermeasure procedure of step 400 is shown in FIG. 4. First, step 401 determines if the set switch is actuated or not. If set switch 14a is in the actuated state, control proceeds to step 402 which determines if set flag FSET is set or not. Since set flag FSET has been already set by step 202 of the set/resume process, step 402 gives a positive output and control proceeds to step 105. Because flag FPULL is still set, step 300 is executed again. Meanwhile, if set switch 14a is undepressed, then step 401 gives a negative output and control proceeds to step 403. Step 403 determines if resume control which is explained later is in progress or not. Step 407 determines if resume switch 14b is actuated or not. Step 408 determines if either flag FACC or flag FCOA is actuated. If all of steps 403, 407 and 408 give negative outputs, control goes to step 409 which resets flag FSET. Next, step 600 which is the busy shift countermeasure process that is explained later is executed and with this, step 400 finishes. Control goes to step 105. Because flag FPULL is set, the process of step 300 is again executed.

For step 300 which is the boost control process, while the idle switch 18 remains actuated, in other words, while step 301 still gives a positive output, step 303, which is the duty ratio setting process for turning the throttle valve 26 rapidly to the open position to cancel idleness and immediately realize a practical amount of aperture, is executed. Step 304 uses counter PULLINT to count the number of iterations of this duty ratio setting process.

Meanwhile if idle switch 18 is deactuated, control proceeds from step 301 to step 305 which determines if flag FPIDL is set or not. Because flag FPIDL has been set in the previous control cycle by step 302, step 305 gives a positive output. Step 306 assigns the value of counter PULLINT which expresses the number of times the fixed duty ratio has been generated so far to idle amount IDL. Then, based on Eq. (2), step 307 again computes PULL, which is a boost control amount for driving the motor 22a to the open side, based on the stored vehicular speed Vm and the idle amount IDL.

$$PULL \leftarrow f(Vm)+IDL \qquad (2)$$

Next, step 308 resets flag FPIDL, step 309 increments counter PULLINT and step 310 sets the duty ratio for setting to the opening side at 95%. Step 311 determines if PULL is greater than or equal to PULLINT. Initially, step 311 gives a negative output since PULL is bigger than PULLINT by f(Vm)−1. Thus, step 106 controls the throttle valve to turn to the open side at a duty ratio of 95%. Therefore, while PULLINT remains less than or equal to PULL, the throttle valve 26 is turned to the open side promptly and thus, the throttle opens quickly. That is, engine output is increased rapidly to realize stored vehicular speed Vm which is set in step 202. In this way, declines in the vehicular speed during the time interval until the actuator 22 realizes the throttle opening for achieving vehicular speed Vm are held down as much as possible.

Because PULLINT is incremented in step 309, then PULLINT becomes greater than or equal to PULL at some point and therefore, step 311 gives a positive output and step 312 resets flag FPULL. Thus, step 105 gives a negative output and step 500 which is the duty ratio computation procedure is executed.

Figure 7:
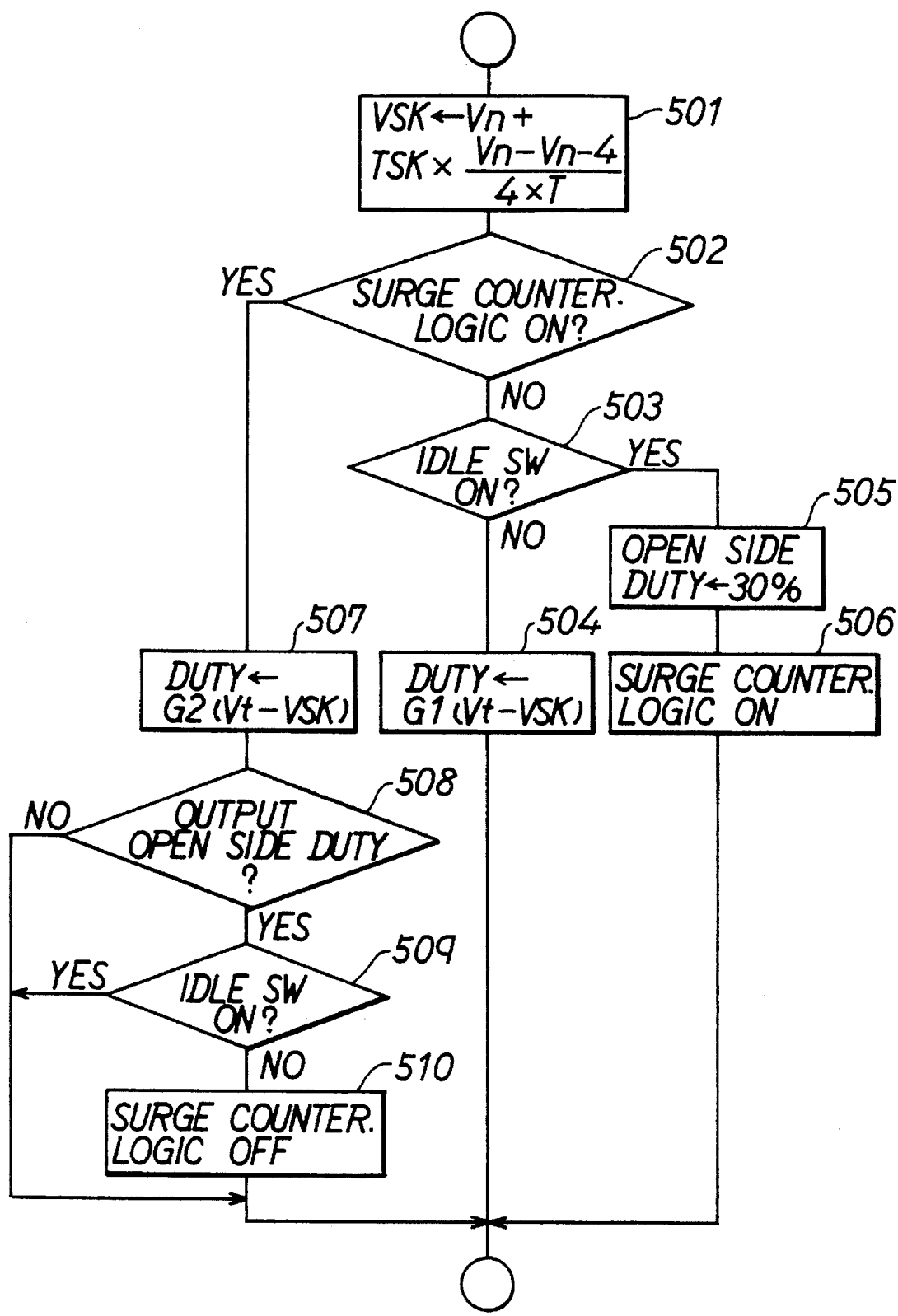
FIG. 7 is a flowchart of the duty ratio computation procedure.

The flowchart of step 500 which is the duty ratio computation procedure is shown in FIG. 7. First, using Eq. (3) (shown below), step 501 computes a skip vehicular speed Vsk which indicates the future speed based on the present vehicular speed Vn, skip time Tsk and the differential value of the vehicular speed (which is actually derived by computing the difference between present vehicular speed Vn and the vehicular speed four control cycles before Vn−4, and dividing that difference with the time duration of four control cycles).

$$Vsk \leftarrow Vn+Tsk \times (Vn-Vn-4)/4T \qquad (3)$$

That is, Vsk is the predicted value of the vehicular speed after time Tsk.

Next, step 502 determines if the logic for the surge countermeasure is actuated. Because such logic is deactuated initially, control goes to step 503 which determines if the idle switch 18 is on. Aside for that time immediately after the implementation of constant speed control, the idle switch 18 is actuated, for example, when the vehicle enters a steep downwardly sloping road while in the constant speed control mode. The condition of step 503 indicates that condition in which there is a high probability for fuel cut in the electronic control fuel injection device 30. Of course, the condition for the fuel cut can be the condition that the idle switch 18 remains actuated for 500 msec or longer.

Figure 10:
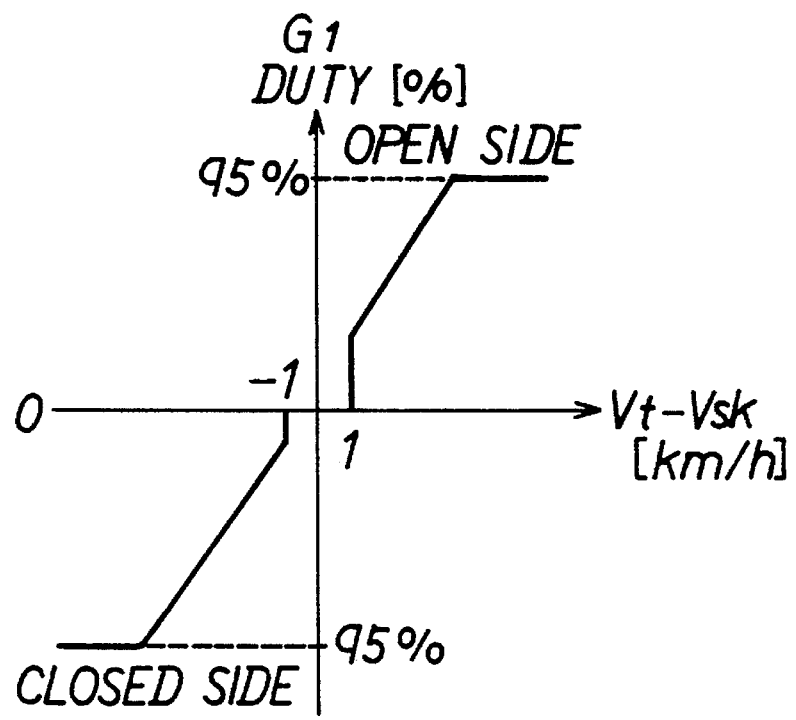
FIG. 10 is a graph for the general computation of the duty ratio.

When the idle switch 18 is in the deactuated state when cruising along flat roads or the like, control goes to step 504, and following a map G1 shown in FIG. 10, the duty ratio DUTY for driving the motor 22a is computed from the deviation (Vt−Vsk:km/h) of the skip vehicular speed Vsk with the target vehicular speed Vt. The higher DUTY is, the faster the rotation frequency of the motor 22a becomes and thus, the faster the throttle valve 26 is turned. This is expressed in Eq. (4).

$$DUTY \leftarrow G1(Vt-Vsk) \qquad (4)$$

It must be noted here that the open side of the throttle is indicated above the horizontal axis of FIG. 10 while the closed side of the throttle is indicated below the horizontal axis. The maximum values for both open and closed sides are set at a duty ratio of 95%. Also, a dead zone is provided in the region where the deviation is above −1 and below 1. This dead zone represents a state wherein the throttle opening is left unchanged. This is achieved by setting the output to the motor 22a to a duty ratio DUTY of 0%. This prevents complications in the driving output of the actuator 22 to the motor 22a.

In this way, by providing map G1, output duty ratio to the open side increases with 95% as the upper limit as the deviation becomes bigger when Vt–Vsk≧1. That is, the bigger the deviation is, the faster the throttle opening increases.

On the other hand, when Vt–Vsk≦1, output duty ratio to the closed side increases with 95% as the upper limit. That is, the smaller the deviation is, the faster the throttle opening decreases.

Hereinafter, if there are no revisions in the conditions, the processes of steps 101–103, 104, 108, 109, 401, 403, 407–409, 600, 105, 501–504 and 106 are executed repeatedly for every control cycle and thus, constant speed cruising control is implemented with feedback control being performed to make vehicular speed Vn equal the target vehicular speed Vt.

When the vehicle reaches a steep downwardly sloping road while it is in the constant speed cruising mode, it will be difficult to lower the vehicular speed to the level of the target vehicular speed Vt even if the throttle opening is reduced, and when the idle switch 18 becomes actuated during constant speed cruising control, step 503 gives a positive output and step 505 sets the duty ratio to the open side at 30%. Accordingly, the throttle opening is increased to a certain degree. This is because the electronic control fuel injection device 30 executes fuel cuts to cut on fuel consumption when the idle switch 18 stays on for a predetermined period of time and so, an increase in the throttle opening stops such fuel cuts or terminates fuel cuts at an early stage, and thus, rapid decline in the vehicular speed is prevented and passenger comfort is somehow enhanced.

Next, step 506 actuates the surge countermeasure logic. Accordingly, for the duty ratio computation process of step 500 in the subsequent control cycles, step 502 gives a positive output and following a map G2 shown in FIG. 11, step 507 computes the duty ratio DUTY for driving the motor 22a based on the deviation (Vt–Vsk:km/h). The higher this duty ratio DUTY is, the higher the rotation frequency of the motor 22a becomes and so, the throttle valve is turned at a high speed in the same way as in the case of FIG. 10. The above can be expressed as Eq. (5) which is shown below.

$$DUTY \leftarrow G2(Vt-Vsk) \quad (5)$$

Map G2 of FIG. 11 differs from map G1 of FIG. 10 in that the dead zone at the closed side is widened for the former. That is, while the dead zone at the open side is the region where deviation is less than 1 (km/h), the deviation at the closed side is set at a zone wherein the deviation is over –5 (km/h). This means that the throttle valve 26 is not turned to the closed side if the vehicular speed Vn exceeds the target vehicular speed Vt by only a slight amount, and for the closed side, with the widening of the dead zone, this means slower speeds in the adjustment of the driving power of the throttle valve 26.

If step 508 determines that the duty ratio computation result of step 507 is in the throttle open side and moreover, if step 509 determines that the idle switch 18 is deactuated, then step 510 deactuates this surge countermeasure logic, and control goes back again to step 504 which executes the regular duty ratio computation.

In this way, for the present embodiment, if the high fuel cut probability condition of step 503 is not satisfied while the vehicle is in the constant speed cruising control mode, duty ratio is computed following map G1 of FIG. 10. On the other hand, if the high fuel cut probability condition of step 503 is satisfied, duty ratio computation is performed following map G2 of FIG. 11 which slows down throttle opening adjustments.

Accordingly, when duty ratio control is performed by only using map G1, fuel cut surges shown in FIGS. 13A–13C wherein vehicular speed changes little by little can be prevented. That is, as shown in the solid line of FIG. 12C, even if there is a fuel cut when the idle switch 18 is actuated, the fluctuation cycle period of the vehicular speed becomes longer and thus, declines in the level of passenger comfort can be prevented. In other words, even if the high fuel cut probability condition is satisfied when the vehicle enters a steep downwardly sloping at the A timing, the electronic control fuel injection device 10 does not execute actual fuel cuts because step 505 immediately increases throttle opening and idle switch 18 deactuates. Therefore, vehicular speed increases with no declines whatsoever and moreover, since the speed of adjustments to the closed side of the throttle opening becomes slower because of the widening of the dead zone at the minus side of deviation (Vt–Vsk), throttle opening does not change and increase in the vehicular speed Vn continues for some time. Then, at the B timing beyond the dead zone where deviation (Vt–Vsk) becomes less than or equal to –5, the throttle opening is driven to decrease for the first time, the idle switch 18 is actuated and vehicular speed Vn declines as fuel cuts commence. Next, at the C timing where deviation (Vt–Vsk) becomes greater than or equal to 1, the throttle opening is driven to increase, idle switch 18 is deactuated and vehicular speed Vn increases again because fuel cuts are terminated. Thereafter, up to a timing D when the steep downwardly sloping road ends, vehicular speed fluctuations occur repeatedly at long periods. In this way, because the fluctuation cycle of the vehicular speed is long due to the fuel cut surges, there is no decline in passenger comfort. After the D timing, because vehicular speed Vn drops when returning to a flat road after the end of a steep downwardly sloping road, throttle opening is increased, idle switch 18 is deactuated and duty ratio to make the motor 22a turn to the open side is generated and thus, surge countermeasure logic terminates and regular control is restored.

Figure 8:
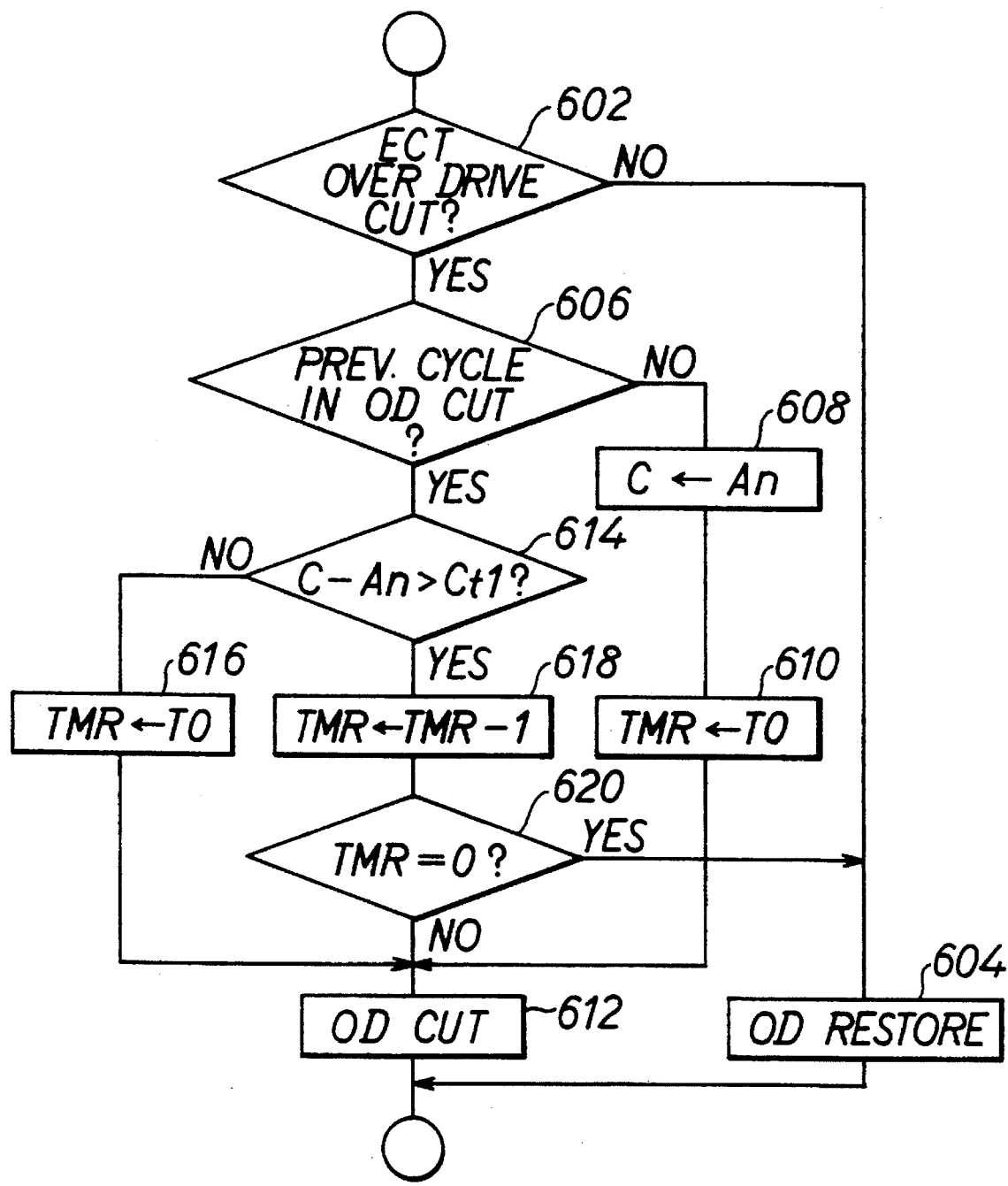
FIG. 8 is a flowchart of the busy shift counter-measure procedure.

Next, the busy shift countermeasure process of step 600 is explained using the flowchart of FIG. 8.

First, step 602 determines if the automatic transmission electronic control device 29 is in overdrive cut or not. Here, overdrive cut indicates that the gear of the automatic transmission 2a is not in overdrive. If the transmission gear is not in overdrive, step 602 gives a negative output and control goes to step 604 which is the overdrive restoration release procedure. That is, the microcomputer 8 provides the automatic transmission electronic control device 29 with an overdrive release signal and thus, the automatic transmission electronic control device 29 can up-shift the gear of the automatic transmission 2a to overdrive.

As shown in the timing charts of FIG. 15A and 15B, when the vehicle is approaching an upwardly sloping road while it is in the constant speed cruising control mode(time t0), if the actuator position is increased to maintain the cruising speed for the constant speed cruising control of the cruise ECU 1, the aperture of the throttle valve 26 increases and when the throttle opening detected by the throttle opening sensor 26a becomes bigger, the automatic transmission electronic control device 29 down-shifts the transmission gear from overdrive to the third gear based on the shift pattern shown in FIG. 14 (time t1).

Immediately after this down-shift, step 602 gives a positive output and control goes to step 606 which determines if there was overdrive cut in the previous control cycle; in other words, this step determines if step 602 gave a positive output in the previous cycle. Because step 602 gave a negative output in the previous cycle, step 606 gives a negative output and step 608 stores the present actuator position An to an overdrive cut aperture value C. Actuator position, for example, can be derived by accumulating the change f (Duty Ratio) in the actuator position An, which is computed using the duty ratio that controls the rotation frequency of the throttle valve 26 used in step 106 as the parameter. However, as explained later, because this actuator position is used in computing the relative drop (C–An) in the actuator position, there is no demand for accuracy in the value of this actuator position. It is sufficient that the relative change can be determined accurately. Also, because the actuator position can be estimated through computations, there is no need for a device for detecting the actuator position.

Next, step 610 sets timer counter TMR to the value of predetermined delay time T0. Next, step 612 performs overdrive cut demand processing. This overdrive cut demand refers to that process wherein the microcomputer 8 of cruise ECU 1 generates a signal to the automatic transmission electronic control device 29 to prohibit up-shifts to the overdrive.

That is, the automatic transmission electronic control device 29 prohibits changing shifts during normal cruising based on a shift pattern which is derived from the relationship shown in FIG. 14 between the vehicular speed and the throttle valve.

In this way, until it receives an overdrive release signal from the microcomputer 8 of the ECU 1, the automatic transmission control device 29 is not able to up-shift the automatic transmission to overdrive even if the region derived based on the shift pattern of FIG. 14 becomes the overdrive region.

In the next control cycle, steps 602 and 606 give positive outputs and step 614 determines if the condition expressed in Eq. (6) is satisfied or not.

$$C-An > Ct1 \tag{6}$$

It must be noted here that first predetermined amount Ct1 almost corresponds to the difference between the actuator position when down-shifting from overdrive which is stored in overdrive cut aperture storage value C of step 608 during overdrive cut and the stable actuator opening after returning to flat roads. This first predetermined amount Ct1 can have a fixed value or a value that depends on the vehicular speed.

It must be noted here that the flat roads for the present embodiment refer to a road having an inclination (a value which indicates how high that portion of the road that is 100 meters ahead is compared to the present portion in meters) which is zero. Also, the first predetermined amount Ct1 does not correspond to that value when the amount of inclination of the road is 0%. This first predetermined amount Ct1 can have a value that corresponds to the difference between the actuator position when the amount of inclination has reached 2% and the actuator position during down-shift. For this case, the first predetermined amount Ct1 has a value smaller than the first predetermined amount Ct1 that is computed from the actuator position after returning to a flat road.

Because Eq. (6) is not satisfied at first, step 614 gives a negative output and step 616 sets timer counter TMR to predetermined delay time T0. Step 612 executes overdrive cut demand processing. While Eq. (6) remains unsatisfied, step 614 gives a negative output and the processes of steps 616 and 612 are iterated. In other words, Eq. (6) remains unsatisfied while cruising along an upwardly sloping road still continues with step 614 giving a negative output and steps 616 and 612 being performed repeatedly.

When cruising along the upwardly sloping road ends and the vehicular speed tends to increase (time t2), step 501 which is the constant speed cruising control lessens actuator position An as it tries to maintain vehicular speed. Accordingly, the condition of Eq. (6) is satisfied and step 615 gives a positive output (time t3).

Next, step 618 decrements timer counter TMR and step 620 determines if timer counter timer TMR is zero or not. At first, step 620 gives a negative output and control goes to step 612 which is the overdrive cut demand procedure. With the provision of timer counter TMR, the overdrive restoration process is allowed only when the condition of Eq. (6) is duly satisfied and the execution of the same process is avoided when step 614 temporarily gives a possibly erroneous positive output due to noise. Therefore, if step 614 continuously gives a positive output for a predetermined delay time T0, step 620 gives a positive output and step 604 allows overdrive (time t4).

During this time, since cruising is already along a flat road, the automatic transmission electronic control device 29 up-shifts the automatic transmission 2a to overdrive based on the shift pattern of FIG. 14. Accordingly, actuator position An decreases further and stabilizes to the same level as that before time t0.

Next, the cancel procedure is explained. Here, cancel refers to the process of step 700 which terminates constant speed cruising control when step 108 determines that the cancel switch 14c of control switch 14 has been actuated while constant speed cruising control is in progress or when step 109 determines that stop lamp switch is actuated due to stepping on the brake.

Figure 9:
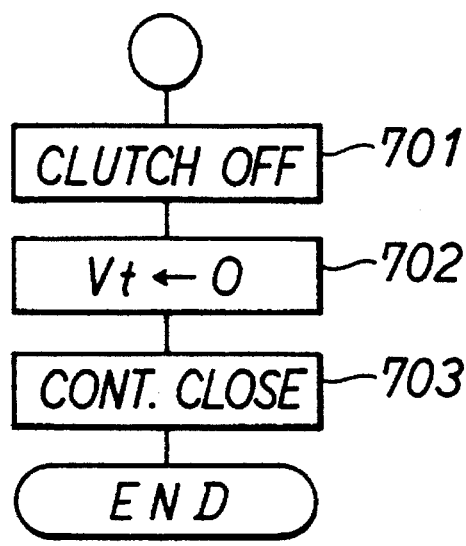
FIG. 9 is a flowchart of the cancel procedure.

The cancel procedure is shown in FIG. 9. First, step 701 deactuates the clutch 22b and step 702 resets target vehicular speed Vt. Step 703 continuously actuates the closed side of motor 22a to make the actuator position fully closed. During this time, the stored vehicular speed Vm is not erased and is maintained as is.

Next, the resume process is explained. Resume refers to the restoration of the present vehicular speed to the level of the stored vehicular speed Vm when constant speed cruising control is not in progress, there is a stored vehicular speed Vm and resume switch 14b has been pressed.

First, step 104 determines that constant speed cruising control is not in progress so it gives a negative output. Then, control proceeds to the process of step 200. If step 201 determines that set switch 14a is deactuated, then control proceeds to step 208 which determines if resume switch 14b is actuated or not. If resume switch 14b is actuated and furthermore, if stored vehicular speed Vm is not zero, then step 210 sets present vehicular speed Vm as the target vehicular speed Vt, actuates clutch 22b and sets flag FRES which indicates that resume control is in progress. Then, the processes of steps 105, 500 and 106 are performed.

In the next control cycle, step 104 gives a positive output and after steps 108 and 109, control proceeds to step 400. Step 401 gives a negative output and step 403 determines if resume control is in progress or not. That is, step 403 determines if flag FRES is set or not. Step 403 gives a positive output and step 404 increments target vehicular speed Vt by a fixed vehicular speed amount D. Then, step 405 determines if target vehicular speed Vt is greater than stored vehicular speed Vm. If Vt≦Vm, the processes of steps 105, 500 and 106 are executed. Therefore, while Vt≦Vm, the target vehicular speed Vt is increased little by little together with executing the processes of steps 105, 500 and 106 to increase vehicular speed Vn. Then, Vt becomes greater than Vm because step 404 continuously increased it. Thus, step 406 sets stored vehicular speed Vm as the target vehicular speed Vt and resets flag FRES.

In the next control cycle, step 403 gives a negative output and since resume switch 14b is no longer depressed, step 407 which determines the actuation of resume switch 14b gives a negative output. Step 408 which determines if either flag FACC or flag FCOA is set gives a negative output and step 409 resets flag FSET. Next, the processes of steps 600, 105, 500 and 106 are executed and constant speed cruising control is implemented.

Next, the acceleration process is explained. Here, acceleration refers to implementing increasing speed control when resume switch 14b is pressed during constant speed cruising control and resuming constant speed cruising control with the vehicular speed Vn as the target vehicular speed Vt when resume switch 14b. First, step 104 determines that constant speed control is in progress and so, after control goes to steps 108 and 109, the process of step 400 comes next. Control goes from step 401 to step 403. When step 403 determines that resume control is not in progress, then if resume switch 14b is pressed and is actuated, then step 407 which determines if resume switch 14b is actuated gives a positive output. Accordingly, step 410 increments target vehicular speed Vt by the fixed vehicular speed amount D and sets flag FACC which indicates acceleration control is in progress. Next, step 500 computes the driving duty ratio for motor 22a using the target vehicular speed Vt which was increased by D and controls the vehicular speed Vn to match this increased vehicular speed Vt. Thus, increased speed control is achieved. As long as the resume switch 14b remains pressed, the target vehicular speed Vt is increased with a predetermined speed such as the legal speed limit as the upper limit together with the increase in the vehicular speed Vn.

When the resume switch 14b is released after the end of acceleration control, step 407 gives a negative output and because flag FACC is set, then step 408 gives a positive output. Step 411 sets the present vehicular speed Vn to the stored vehicular speed Vm and the target vehicular speed Vt and furthermore, flags FACC and FCOA are reset. After this, constant speed cruising control is restored.

Next, the cost procedure is explained. The cost procedure refers to implementing decreasing speed control when set switch 14a is pressed when constant speed cruising control is in progress and returning to constant speed cruising control when the set switch 14a is released with the vehicular speed during the release of set switch 14a set as the target vehicular speed Vt. First, step 104 determines that constant speed cruising control is in progress and after control goes to steps 108 and 109, step 400 comes next. Step 401 determines if set switch 14a is actuated or not. Because flag FSET was already reset in step 409, step 402 gives a negative output. Step 412 generates a fixed duty ratio of 30% for driving the motor 22a to the closed side and sets flag FCOA which indicates that cost control is in progress. Then after step 106 generates the duty ratio, control goes to the next control cycle. It must be noted here that step 402 which determines if flag FSET or not is provided to distinguish the setting of set switch 14a during set operations from the setting of set switch 14a during cost control.

Because set switch 14a is released when ending cost control, control goes from step 401 to 408 via steps 403 and 407. Because flag FCOA is set, step 408 gives a positive output. Next, step 411 sets the present vehicular speed Vn as the stored vehicular speed Vm and the target vehicular speed Vt and resets flags FACC and FCOA. After this, constant speed cruising control is restored.

Because the busy shift countermeasure procedure is constructed like the flowchart of FIG. 8, a high level of passenger comfort is achieved for the present embodiment because there are no periodic fluctuations in the vehicular speed even when driving along long upwardly sloping roads since, as shown in FIGS. 16A–16C, there are no up-shifts to the overdrive because such up-shifts to the overdrive are not allowed when driving along upwardly sloping roads. Conventionally, as shown by FIG. 16D–16F, passenger comfort is not of a high level because of periodic fluctuations in the vehicular speed which are caused by up-shifts to the overdrive that are allowed after a predetermined period of time lapses.

Also, because the vehicular speed fluctuation period for the present embodiment is longer than in conventional systems, there are no declines in the level of passenger comfort even if fuel cut surges occur when cruising along downwardly sloping roads.

Figure 17:
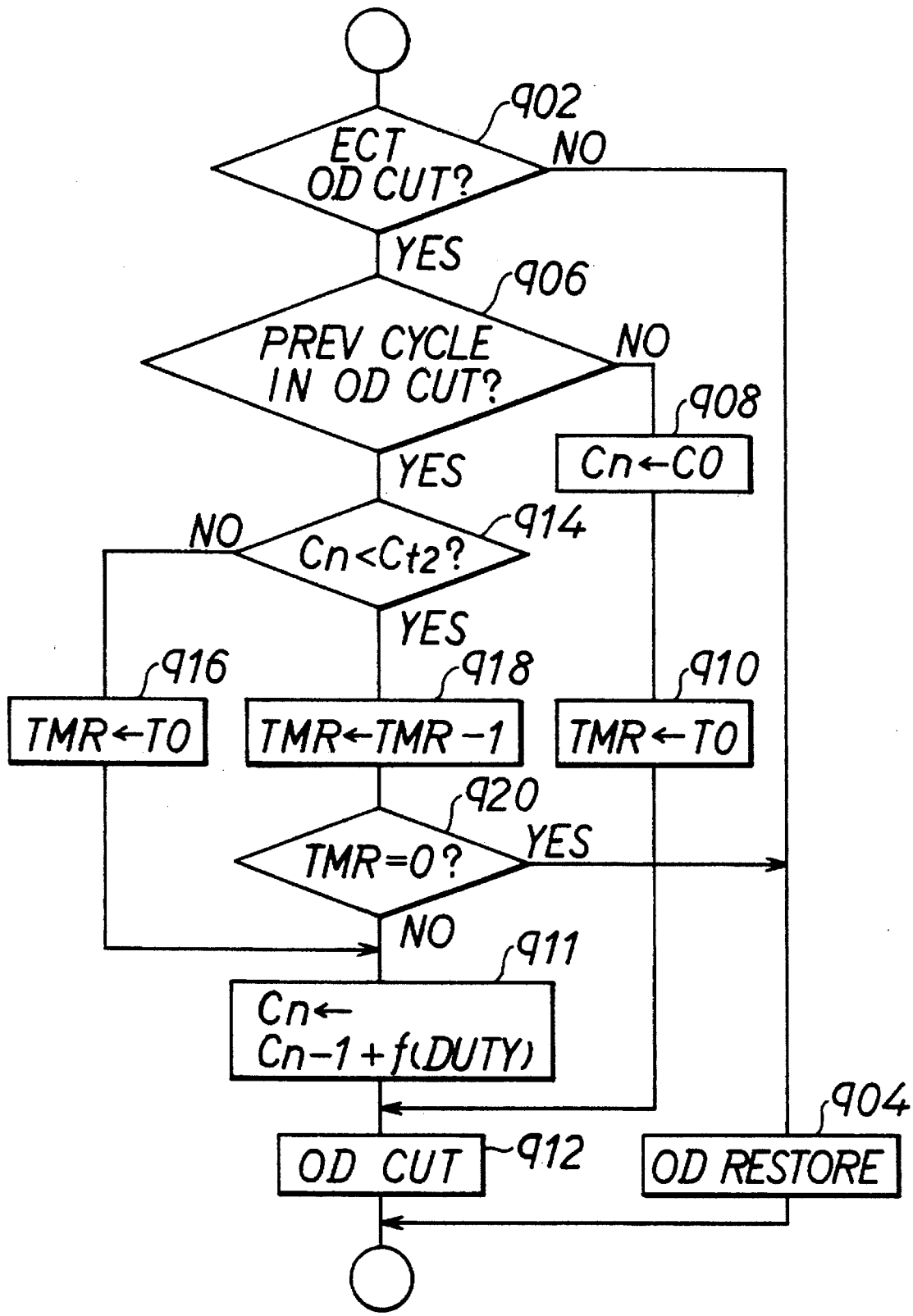
FIG. 17 is a flowchart of the busy shift countermeasure procedure according to a second embodiment of the present invention.

In a second embodiment of the present invention, the busy shift countermeasure procedure shown in FIG. 17 is used in place of the busy shift countermeasure process shown in FIG. 8 described above. It must be noted here that the explanations for the processes of steps 902, 904, 906, 910, 912, 916, 918 and 920 are omitted here since they are the same as the processes of steps 602, 604, 606, 610, 612, 616, 618 and 620 of FIG. 8.

That is, when the automatic transmission electronic control device 29 executes overdrive cuts on the automatic transmission 2a, step 902 gives a positive output while step 906 gives a negative output. Step 908 sets the present virtual aperture C0 of the actuator 22 to virtual aperture Cn. This virtual aperture Cn, as shown in step 911 which is described later, is derived and estimated by accumulating actuator position change f which is computed from duty ratio used in step 106 and which controls the rotation frequency of throttle valve 26. It must be noted here that this virtual aperture expresses an absolute aperture.

Next, step 910 sets predetermined delay time T0 as the value of time counter TMR. Step 912 provides the overdrive cut demand to the automatic transmission electronic control device 29.

In the next control cycle, steps 902 and 906 give positive outputs and step 914 determines if virtual aperture Cn is smaller than predetermined virtual aperture Ct2. As shown in FIG. 15B, this predetermined virtual aperture Ct2 corresponds to an aperture which is equal to or slightly larger than the actuator position that corresponds to the stable throttle opening at the target cruising speed along flat roads. At first, step 914 gives a negative output. Then, step 916 is executed. Step 911 computes a new Cn using Eq. (7) which is shown below.

$$Cn \leftarrow Cn-1+f(\text{Duty Ratio}) \qquad (27)$$

Here, Cn−1 represents the virtual aperture Cn of the previous cycle.

Next, step 912 is executed and control exits from the busy shift countermeasure procedure. Hereinafter, unless step 914 gives a positive output, step 911 keeps on computing the absolute virtual aperture and step 912 keeps on generating overdrive cut demands.

If virtual aperture Cn becomes smaller than predetermined virtual aperture Ct2 (shown in time t3 of FIGS. 15A and 15B), step 914 gives a positive output and step 918 decrements timer counter TMR. Next, step 920 is executed. At first, step 920 gives a negative output and so, control proceeds to steps 911 and 912.

When timer counter TMR=0, step 920 gives a positive output and step 904 which allows the restoration of overdrive is executed (time t4).

In this way, with this construction, the present embodiment gives the same effects as that of the first embodiment.

It must be noted here that while step 908 sets the virtual aperture C0 of the actuator 33 during that time as the virtual aperture Cn, it may be that the initial value of the virtual aperture Cn is set to "0" and in doing so, the virtual aperture Cn is reset every time the automatic transmission electronic control device 29 generates overdrive cuts to the automatic transmission and an accumulation of the actuator position change f is set as the value of the virtual aperture thereafter. In this case, the virtual aperture Cn represents the relative amount of change in the aperture since the execution of step 908 and that amount of change is determined by step 914.

In this way, by determining the actuator position using the derived amount of aperture change which is reset every time there is an overdrive cut, a relatively accurate estimate of the actuator position is possible using f (Duty Ratio) without directly computing the duty ratio and thus, proper control is possible. The same effect can be achieved in the other embodiments with the use of this relative amount.

Meanwhile, because the virtual aperture is estimated from the actuator output, errors, which are due to differences in the characteristics of the actuator, in the link load of the vehicles or the like, can likely occur. This is because all vehicular actuators will not likely operate in the same way even if the same power is applied to them. This error accumulates gradually while constant speed control is in progress and thus, this virtual aperture might vary greatly from the actual actuator position. Therefore, computing the virtual aperture may at times be somewhat difficult.

Here, we look into the use of the automatic transmission (A/T) shift pattern. In general, the shift pattern of the automatic transmission is determined based on the map of the vehicular speed (output axis rotation frequency of the transmission) and the throttle opening. Therefore, if the A/T down-shifts while in the constant speed control mode at a certain set speed during cruise control, the throttle opening during that time can be estimated from that set speed.

As described above, the throttle opening when the A/T down-shifts can be estimated from the vehicular speed. Accordingly, at the instant when down-shift is performed, the virtual aperture can be set to the actuator position which is determined from the throttle opening during down-shift at that certain speed. In other words, the accumulated error of the virtual aperture can be reduced to zero and thus, its reliability as an absolute value improves. In addition, during shift control, this virtual aperture is used only for a short period (about 100 sec. for regularly sloping roads) and thus, because the use of this virtual aperture ends before the above-described error accumulates, the virtual aperture can be reliably used here. Therefore, by setting the actuator position, which is estimated from the throttle opening derived from the vehicular speed, as the value of Cn in step 908 of the second embodiment, it can be considered as an accurate virtual aperture whose accumulated errors have been removed. Moreover, as in the first embodiment, because the method for detecting the difference with the virtual aperture during down-shift also detects the relative change in the actuator position, and as described above, because the accumulated error represents errors during a short interval after down-shift, the disparity between the actual amount of change in the actuator and the relative amount of change in the actuator position that is derived from the virtual aperture becomes very small.

Figure 18:
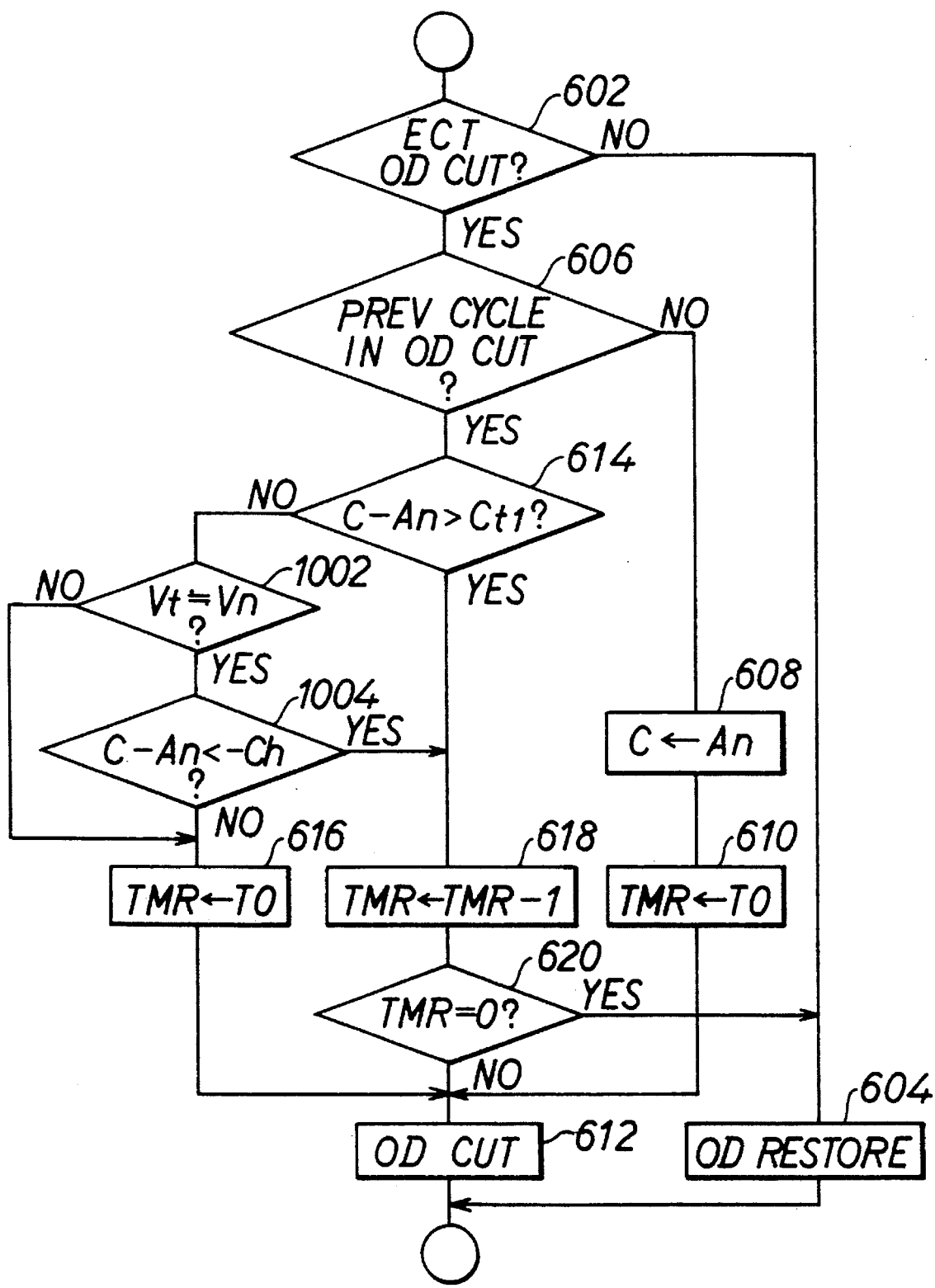
FIG. 18 is flowchart of the busy shift countermeasure procedure which includes a manual overdrive cut countermeasure process according to a third embodiment of the present invention.

A third embodiment of the present invention which uses a manual overdrive cut countermeasure procedure shown in the flowchart of FIG. 18 in place of the above-described busy shift countermeasure procedure of FIG. 8 is explained hereinafter. The flowcharts of FIG. 8 and FIG. 18 are exactly the same, except that steps 1002 and 1004 are added to the flowchart of FIG. 18.

That is, as shown in FIGS. 19A and 19B, when the driver actuates the overdrive off switch 29a unnecessarily or by some kind of mistake (time t30) and the automatic transmission electronic control device 29 generates an overdrive cut to the automatic transmission 2a, step 602 gives a positive output and step 606 gives a negative output. Step 608 sets the present actuator position An as overdrive cut aperture storage value C. Next, step 610 sets the value of predetermined delay time T0 to predetermined timer TMR and step 612 generates an overdrive cut demand to the automatic transmission electronic control device 29.

In the next control cycle, steps 602 and 606 give positive outputs and step 614 determines if the condition of Eq. (6) is satisfied or not.

When the overdrive off switch 29a is simply actuated, as shown in FIG. 19B, the actuator position An increases and thus, because Eq. (6) is not satisfied, step 614 gives a negative output. Step 1002 checks if target vehicular speed Vt and the present vehicular speed Vn are almost equal or not. As shown in FIG. 19A, while vehicular speed Vn decreases temporarily immediately after the manual execution of overdrive cut, it gradually returns to the original vehicular speed (target vehicular speed) due to constant speed cruising control. Therefore, at first, step 1002 gives a negative output, step 616 sets timer counter TMR to the value of predetermined delay time T0 and step 612 executes the overdrive cut procedure. Even if step 1002 gives a positive output, steps 616 and 612 are executed until Eq. (8) of step 1004 is satisfied.

$$C-An<-Ch \tag{8}$$

Here, second predetermined value Ch is almost equal to the difference between the actuator position after down-shifting from overdrive which is stored in overdrive cut aperture storage value C in step 608 during overdrive cut and the actuator position when the vehicular speed has returned to the original vehicular speed (target vehicular speed) after down-shift. This second predetermined value Ch can have a fixed value or a value that is dependent on the vehicular speed.

Unless Eq. (8) is satisfied, either step 1002 or 1004 gives a positive output and the processes of steps 616 and 612 are iterated. That is, unless the actuator position and the vehicular speed at the present gear after down-shifting from overdrive stabilize, Eq. (8) will not be satisfied and up-shift prohibition to the overdrive continues. When the increased actuator position and the vehicular speed, which dropped for a while to go up later, stabilize as in time t31, steps 1002 and 1004 give positive outputs. Step 618 decrements timer counter TMR and step 620 determines if timer counter TMR is zero or not. At first, step 620 gives a negative output and so, control goes to step 612 which is the overdrive cut demand procedure. In the same way as the first embodiment, timer counter TMR exists to prevent the allowance of overdrive restoration procedure when the steps 1002 and 1004 give positive outputs which are probably due to noise-related errors. This timer counter TMR allows the overdrive restoration process of step 604 only when the condition of Eq. (8) is duly satisfied. Therefore, if steps 1002 and 1004 continue to give positive outputs for at least the predetermined delay time T0, then step 620 gives a positive output and step 604 allows up-shifting to overdrive (time t32).

Because the present embodiment is constructed like this, even if the overdrive off switch 29a is actuated by the driver superfluously or by some kind of error, up-shift to the overdrive is not allowed because of the condition of step 614. Also, according to the processes of steps 1002 and 1004, up-shifts to overdrive are allowed at an early stage after down-shift and thus, thereafter, when the driver deactuates overdrive off switch 29a, up-shift to the overdrive can be done immediately (time t33), the vehicular speed and actuator position converges (time t34) to levels before the actuation (time t30) of the overdrive off switch 29a and constant speed cruising control is performed continuously. Of course, the present embodiment has the same effects as that of the first embodiment.

As shown by the map of FIG. 11, while dead zone at the closed side is widened as the fuel cut surge countermeasure logic of the above embodiments, the open side can also be widened instead. In doing so, a decrease in the vehicular speed which is above the predetermined value can be allowed and the period of the fuel cut surge can be set longer. Furthermore, both dead zones at the open and closed sides can be widened and in doing so, the fluctuation period for the vehicular speed becomes longer.

While step 503 expresses the condition that there is a high probability of fuel cut, it can also be set as the condition for fuel cut itself. Also, if the electronic control fuel injection device employs other conditions for fuel cuts, those conditions or nearly equivalent conditions can also be employed in step 503.

Also, as the deviation for the above embodiments, while Vt–Vsk, that is, the amount which results when the vehicular speed that is thought to be reached after time Tsk lapses is subtracted from the vehicular speed Vt, is used in the above embodiments, Vt–Vn can also be used or Vt–Vn with a constant added to or subtracted from it can also be used instead.

Also, step 507 can also be set to prohibit states where there is no map at the closed side, that is, closed side outputs can also be prohibited. For such case, the change in the vehicular speed becomes like a broken line and steps 505 and 507 operate to terminate adjustments.

Moreover, the slowing down of the throttle opening adjustment can also be executed not only by widening the dead zone but also by lessening the entire duty ratio which is set according to the deviation or by adjusting the duty ratio in correspondence with the change in the deviation, that is, by reducing the slope of map G2.

Although the present invention has been fully described in connection with preferred embodiments thereof in reference with to accompanying drawings, it is to be noted that various changes and modifications will become apparent to those skilled in the art. Such changes and modifications are to be understood as being within the scope of the present invention as defined by the appended claims.

What is claimed is:

1. A vehicular constant speed cruising control system for a vehicle which has an automatic transmission control device that automatically shifts gears of a transmission in said vehicle, said vehicular constant speed cruising control system comprising:

vehicular speed detection means for detecting a vehicular speed of said vehicle;

an actuator for adjusting a throttle opening of an engine of said vehicle;

down-shift detection means for detecting a down-shift in said automatic transmission control device;

constant speed cruising control means for adjusting a driving force of said engine based on a difference between said detected vehicular speed and a target cruising speed by controlling said actuator, using an actuator adjustment amount, to make said vehicular speed coincide with said target cruising speed;

down-shift adjustment amount storage means for storing an actuator adjustment amount generated by said constant speed cruising control means when said down-shift detection means detects a down-shift;

up-shift prohibition means for prohibiting a regular up-shift of said automatic transmission control device after said down-shift detection means detects a down-shift; and up-shift release means for releasing an up-shift prohibition of said up-shift prohibition means when said actuator adjustment amount generated by said constant speed cruising control means drops by an amount, not less than a first predetermined amount, from said actuator adjustment amount stored by said down-shift adjustment amount storage means.

2. The vehicular constant speed cruising control system of claim 1, wherein:

said automatic transmission control device is further for manually executing a down-shift; and said system further includes down-shift vehicular speed storage means for storing a detected vehicular speed when said down-shift detection means detects a down-shift, and additional up-shift release means for releasing an up-shift prohibition when an actuator adjustment amount generated by said constant speed cruising control means rises above an actuator adjustment amount stored by said down-shift adjustment amount storage means by a second predetermined amount and said detected vehicular speed is approximately equal to said vehicular speed stored by said down-shift vehicular speed storage means.

3. The vehicular constant speed cruising control system of claim 2, wherein a target shift gear for up-shift prohibition by said up-shift prohibition means and for up-shift release by said up-shift release means is overdrive.

4. The vehicular constant speed cruising control system of claim 2, said vehicular constant speed cruising control system further comprising up-shift release means for releasing an up-shift prohibition of said up-shift prohibition means when said actuator adjustment amount generated by said constant speed cruising control means drops by an amount, not less than a first predetermined amount, from said actuator adjustment amount stored by said down-shift adjustment amount storage means.

5. The vehicular constant speed cruising control system of claim 2, said vehicular constant speed cruising control system further comprising up-shift release means for releasing an up-shift prohibition of said up-shift prohibition means when an actuator adjustment amount generated by said constant speed cruising control means falls below an amount not less than and approximately equal to said actuator adjustment amount that corresponds to a throttle opening for flat roads at said target cruising speed after down-shift.

6. The vehicular constant speed cruising control system of claim 1, wherein said first predetermined amount is set according to said detected vehicular speed.

7. The vehicular constant speed cruising control system of claim 1, wherein said constant speed cruising control means is for computing said actuator adjustment amount by accumulating values derived through computations in which outputs which drive said actuator are parameters.

8. The vehicular constant speed cruising control system of claim 1, wherein said constant speed cruising control means is for computing said actuator adjustment amount by accumulating values derived through computations in which outputs and electric power voltages which drive said actuator are parameters.

9. The vehicular constant speed cruising control system of claim 1, said vehicular constant speed cruising control system further comprising:

down-shift vehicular speed storage means for storing a detected vehicular speed when said down-shift detection means detects a down-shift; and additional up-shift release means for releasing an up-shift prohibition of said up-shift prohibition means when said actuator adjustment amount equals or exceeds an amount not greater than, and approximately equal to, an actuator adjustment amount that corresponds to a stable throttle opening at flat roads on said target cruising speed after down-shift.

10. The vehicular constant speed cruising control system of claim 1, wherein said first predetermined amount is not greater than a difference between said actuator adjustment amount stored by said downshift adjustment amount storage means and an actuator adjustment amount which corresponds to a stable throttle opening for flat roads at said target cruising speed after down-shift.

11. A vehicular constant speed cruising control system for a vehicle which has an automatic transmission control device that automatically shifts gears of an automatic transmission in said vehicle, said vehicular constant speed cruising control system comprising:

vehicular speed detection means for detecting a vehicular speed of said vehicle;

an actuator for adjusting a throttle opening of an engine of said vehicle;

down-shift detection means for detecting a down-shift in said automatic transmission control device;

constant speed cruising control means for adjusting a driving force of said engine based on a difference between said detected vehicular speed and a target cruising speed by controlling said actuator, using an actuator adjustment amount computed by accumulating values derived through computations in which outputs which drive said actuator are parameters, to make said vehicular speed coincide with said target cruising speed;

up-shift prohibition means for prohibiting a regular up-shift of said automatic transmission control device after said down-shift detection means detects a down-shift; and up-shift release means for releasing an up-shift prohibition of said up-shift prohibition means when an actuator adjustment amount generated by said constant speed cruising control means falls below an amount not less than and approximately equal to said actuator adjustment amount that corresponds to a throttle opening for flat roads at said target cruising speed after down-shift.

12. The vehicular constant speed cruising control system of claim 11, said vehicular constant speed cruising control device further comprising:

down-shift vehicular speed storage means for storing a detected vehicular speed when said down-shift detection means detects a down-shift; and additional up-shift release means for releasing an up-shift prohibition of said up-shift prohibition means when said actuator adjustment amount equals or exceeds an amount not greater than, and approximately equal to, an actuator adjustment amount that corresponds to a stable throttle opening at flat roads on said target cruising speed after down-shift.

13. The vehicular constant speed cruising control system of claim 11, wherein a target shift gear for up-shift prohibition by said up-shift prohibition means and for up-shift release by said up-shift release means is overdrive.

14. The vehicular constant speed cruising control system of claim 11, wherein said constant speed cruising control means is for computing said actuator adjustment amount by accumulating values derived through computations in which outputs and electric power voltages which drive said actuator are parameters.

15. A vehicular constant speed cruising control system for a vehicle which has an automatic transmission control device that automatically shifts gears of an automatic transmission in said vehicle, said vehicular constant speed cruising control system comprising:

vehicular speed detection means for detecting a vehicular speed of said vehicle;

an actuator for adjusting a throttle opening of an engine of said vehicle;

down-shift detection means for detecting a down-shift in said automatic transmission control device;

constant speed cruising control means for adjusting a driving force of said engine based on a difference between said detected vehicular speed and a target cruising speed by controlling said actuator, using an actuator adjustment amount, to make said vehicular speed coincide with said target cruising speed;

up-shift prohibition means for prohibiting a regular up-shift of said automatic transmission control device after said down-shift detection means detects a down-shift; and up-shift release means for releasing an up-shift prohibition of said up-shift prohibition means when an actuator adjustment amount generated by said constant speed cruising control means falls below an amount not less than and approximately equal to said actuator adjustment amount that corresponds to a throttle opening for flat roads at said target cruising speed after down-shift; and actuator position setting means for setting an actuator position which is derived from a relationship between detected vehicle speed and throttle opening when said down-shift detection means detects a down-shift;

wherein said constant speed cruising control means computes said actuator adjustment amount by multiplying said actuator adjustment amount from said actuator position setting means by an amount which derived from a computation in which power which drives said actuator is a parameter.

16. The vehicular constant speed cruising control system of claim 15, said vehicular constant speed cruising control device further comprising:

down-shift vehicular speed storage means for storing a detected vehicular speed when said down-shift detection means detects a down-shift; and additional up-shift release means for releasing an up-shift prohibition of said up-shift prohibition means when said actuator adjustment amount equals or exceeds an amount not greater than, and approximately equal to, an actuator adjustment amount that corresponds to a stable throttle opening at flat roads on said target cruising speed after down-shift.

17. The vehicular constant speed cruising control system of claim 15, wherein a target shift gear for up-shift prohibition by said up-shift prohibition means and for up-shift release by said up-shift release means is overdrive.

18. The vehicular constant speed cruising control system of claim 15, wherein said constant speed cruising control means is for computing said actuator adjustment amount by accumulating values derived through computations in which outputs which drive said actuator are parameters.

* * * * *